US012597995B2

(12) United States Patent
Sajassi et al.

(10) Patent No.: US 12,597,995 B2
(45) Date of Patent: Apr. 7, 2026

(54) TECHNIQUES FOR IMPLEMENTING LEO SATELLITE NETWORKS

(71) Applicant: Cisco Technology, Inc., San Jose, CA (US)

(72) Inventors: Ali Sajassi, Alamo, CA (US); Arman Rezaee, San Francisco, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 18/078,838

(22) Filed: Dec. 9, 2022

(65) Prior Publication Data

US 2024/0195490 A1     Jun. 13, 2024

(51) Int. Cl.
*H04B 7/185*        (2006.01)
*H04W 64/00*        (2009.01)
*H04W 40/20*        (2009.01)

(52) U.S. Cl.
CPC ...... *H04B 7/18523* (2013.01); *H04W 64/003* (2013.01); *H04W 40/20* (2013.01)

(58) Field of Classification Search
CPC ............... H04B 7/185; H04B 7/18523; H04B 7/18526; H04B 7/1851; H04B 7/18513; H04B 7/18515; H04B 7/18517; H04B 7/18519; H04B 7/18521; H04W 64/003; H04W 40/20
See application file for complete search history.

(56) References Cited

U.S. PATENT DOCUMENTS

| | | | |
|---|---|---|---|
| 6,178,163 B1 | 1/2001 | Yuan et al. | |
| 6,404,769 B1 * | 6/2002 | Kapoor .............. | H04B 7/18584 342/353 |
| 2012/0263042 A1 | 10/2012 | Natarajan et al. | |

(Continued)

FOREIGN PATENT DOCUMENTS

WO     WO-2022220859 A1 *    10/2022    ......... H04B 7/18584

OTHER PUBLICATIONS

CN 113489525 A),Ji et al., Routing Method for LEO Satellite Constellation, Oct. 2021, pp. 1-15 (Year: 2021).*

(Continued)

*Primary Examiner* — Keith Ferguson
(74) *Attorney, Agent, or Firm* — Lee & Hayes, P.C.

(57)        ABSTRACT

Described herein are techniques for implementing a low earth orbit (LEO) satellite network and routing communications (e.g., packets) over that network. In embodiments, the techniques may comprise receiving, at a first ground station computing device, a request to determine destination information for a communication, determining, at the first ground station computing device based on information about the communication, a target computing device to which the communication is to be routed, determining, at the first ground station computing based on the target computing device, a location of a destination ground station, determining, at the first ground station computing by mapping orbital data to the location of the destination ground station, a destination satellite, generating the destination information to include at least an address for the destination satellite, and providing the destination information in response to the request.

16 Claims, 14 Drawing Sheets

(56) References Cited

U.S. PATENT DOCUMENTS

| | | |
|---|---|---|
| 2014/0177522 A1 | 6/2014 | Marshack et al. |
| 2016/0037434 A1 | 2/2016 | Gopal et al. |
| 2018/0084476 A1 | 3/2018 | Kay et al. |
| 2018/0167136 A1 | 6/2018 | Eickhoff |
| 2018/0309508 A1 | 10/2018 | Regan et al. |
| 2020/0343968 A1 | 10/2020 | Liu et al. |
| 2022/0217607 A1* | 7/2022 | Lin ...................... G01S 19/256 |
| 2022/0225201 A1 | 7/2022 | Rezaee et al. |
| 2023/0075345 A1* | 3/2023 | Ravishankar ...... H04B 7/18521 |

OTHER PUBLICATIONS

CN 110324074 A), Scott, Using the Virtual Routing System to Move Non-geostationary Orbit Route, Oct. 2019, pp. 1-20 (Year: 2019).*

The PCT Search Report and Written Opinion for International Application No. PCT/US2023/083176, dated May 10, 2024, 12 pages.

* cited by examiner

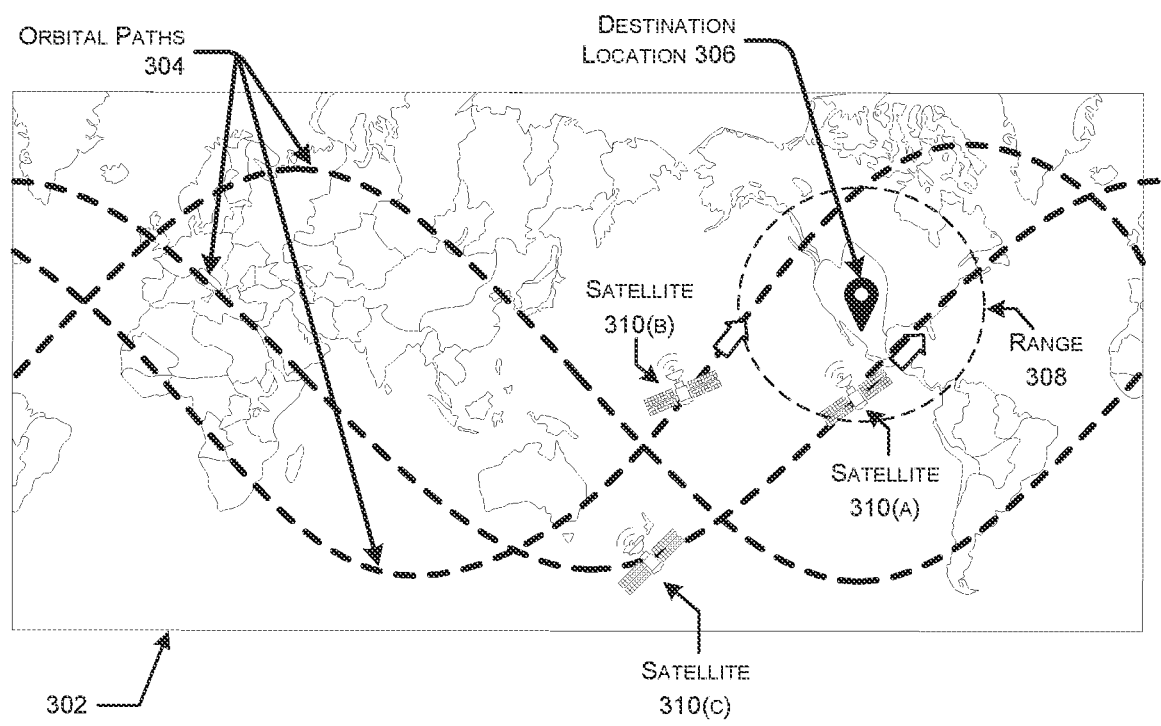
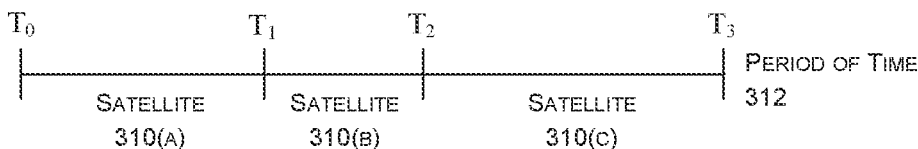
FIG. 3

| Destination | Begin Time | End Time | Next Hop |
|---|---|---|---|
| 10.0.0.0 | 01:01:2023:00:00:00 | 01:01:2023:07:24:01 | 3 |
| | 01:01:2023:15:24:01 | 01:01:2023:11:45:23 | 2 |
| | 01:01:2023:18:45:23 | 01:01:2023:19:13:33 | 3 |
| | 01:01:2023:19:13:33 | 01:01:2024:00:00:00 | 1 |
| 10.0.10.0 | 01:01:2023:00:00:00 | 01:01:2023:07:24:01 | 3 |
| | 01:01:2023:15:24:01 | 01:01:2023:12:12:25 | 4 |
| | 01:01:2023:12:12:25 | 01:01:2023:17:05:53 | 1 |

TABLE ENTRY
510

COMMUNICATION
CONNECTION
604

SATELLITE
NODES 602

900

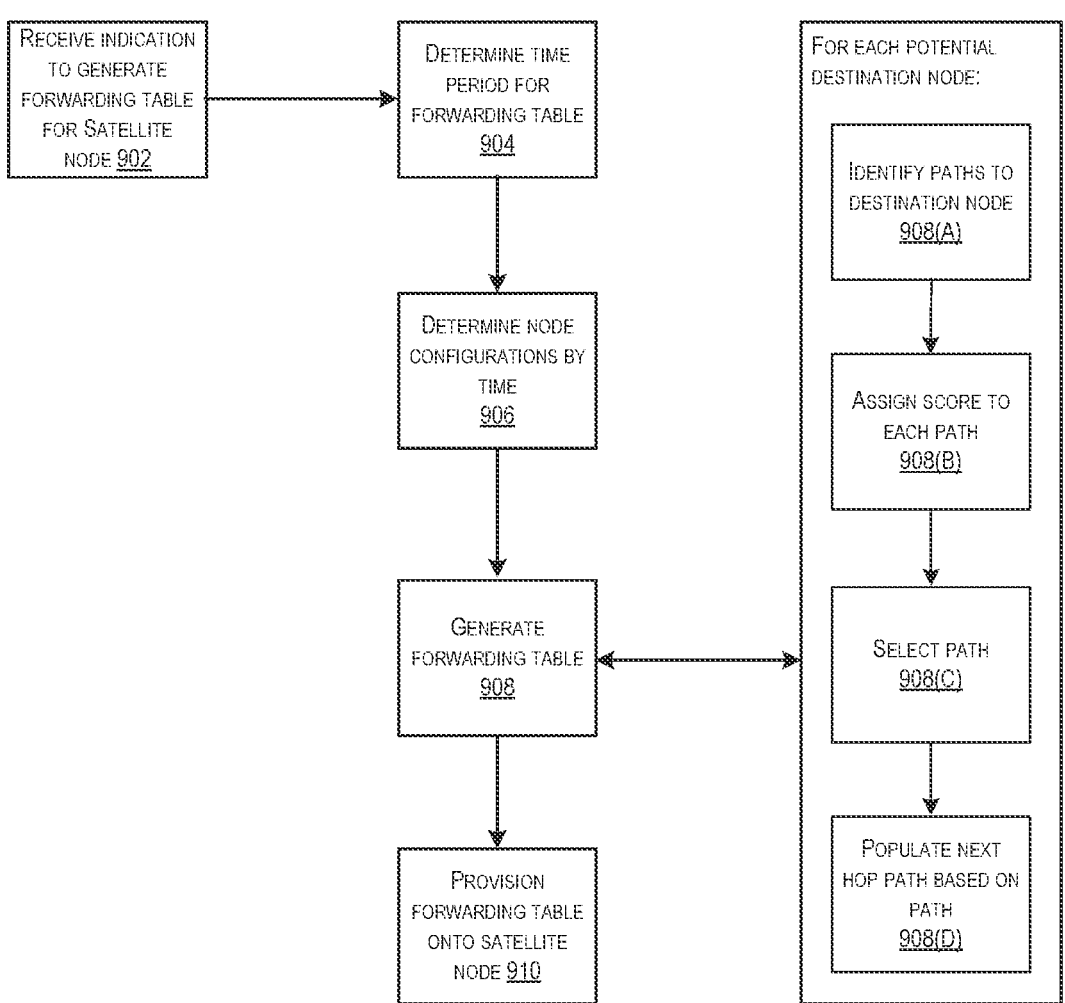

RECEIVE INDICATION TO GENERATE FORWARDING TABLE FOR SATELLITE NODE 902

DETERMINE TIME PERIOD FOR FORWARDING TABLE 904

DETERMINE NODE CONFIGURATIONS BY TIME 906

GENERATE FORWARDING TABLE 908

PROVISION FORWARDING TABLE ONTO SATELLITE NODE 910

FOR EACH POTENTIAL DESTINATION NODE:

IDENTIFY PATHS TO DESTINATION NODE 908(A)

ASSIGN SCORE TO EACH PATH 908(B)

SELECT PATH 908(C)

POPULATE NEXT HOP PATH BASED ON PATH 908(D)

FIG. 9

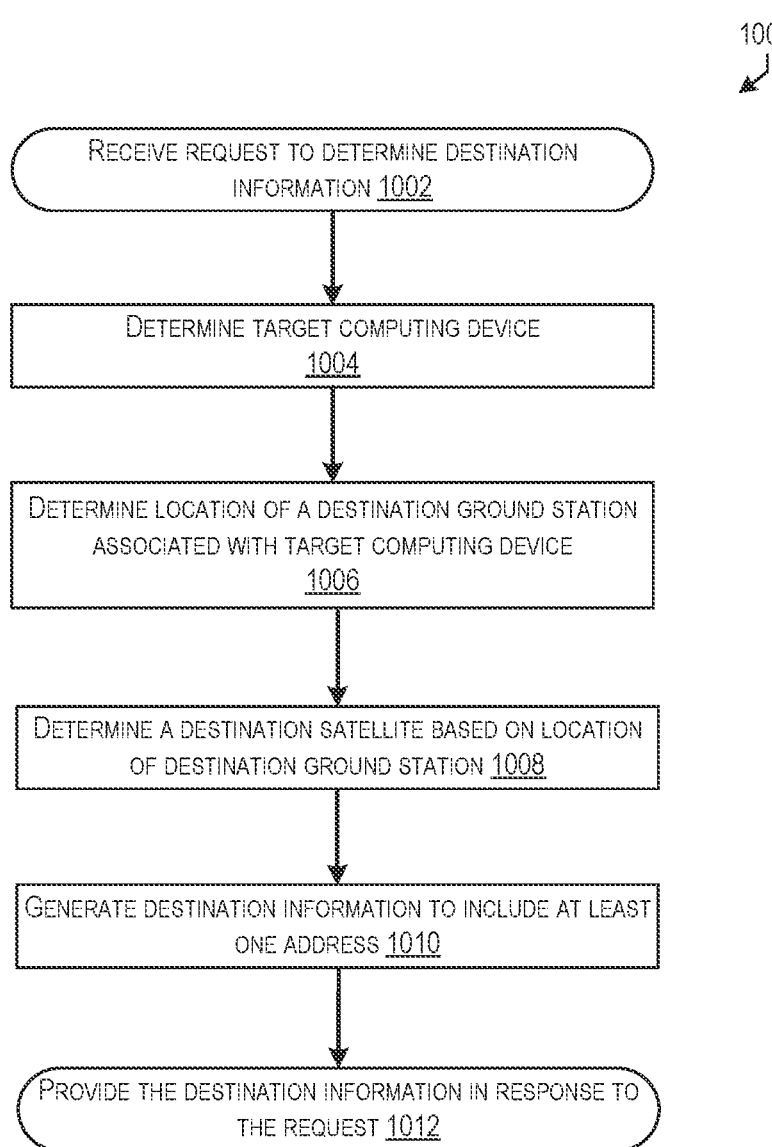

1000

RECEIVE REQUEST TO DETERMINE DESTINATION
INFORMATION 1002

DETERMINE TARGET COMPUTING DEVICE
1004

DETERMINE LOCATION OF A DESTINATION GROUND STATION
ASSOCIATED WITH TARGET COMPUTING DEVICE
1006

DETERMINE A DESTINATION SATELLITE BASED ON LOCATION
OF DESTINATION GROUND STATION 1008

GENERATE DESTINATION INFORMATION TO INCLUDE AT LEAST
ONE ADDRESS 1010

PROVIDE THE DESTINATION INFORMATION IN RESPONSE TO
THE REQUEST 1012

FIG. 10

1100
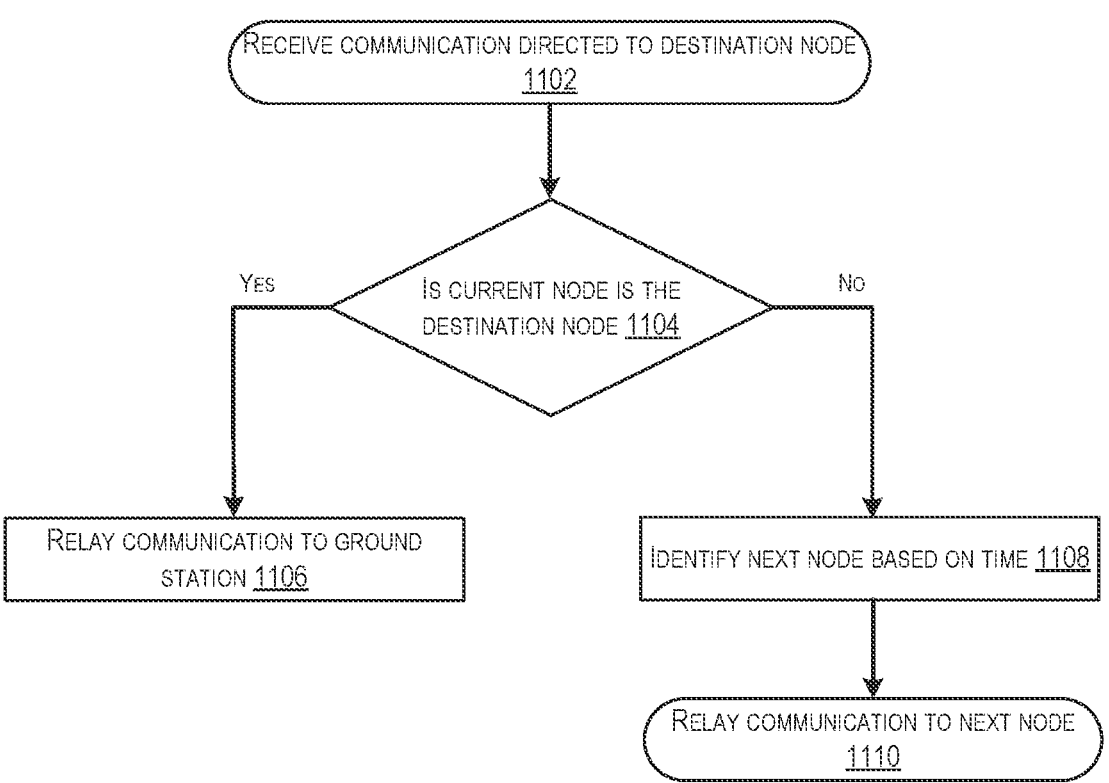
FIG. 11

1200

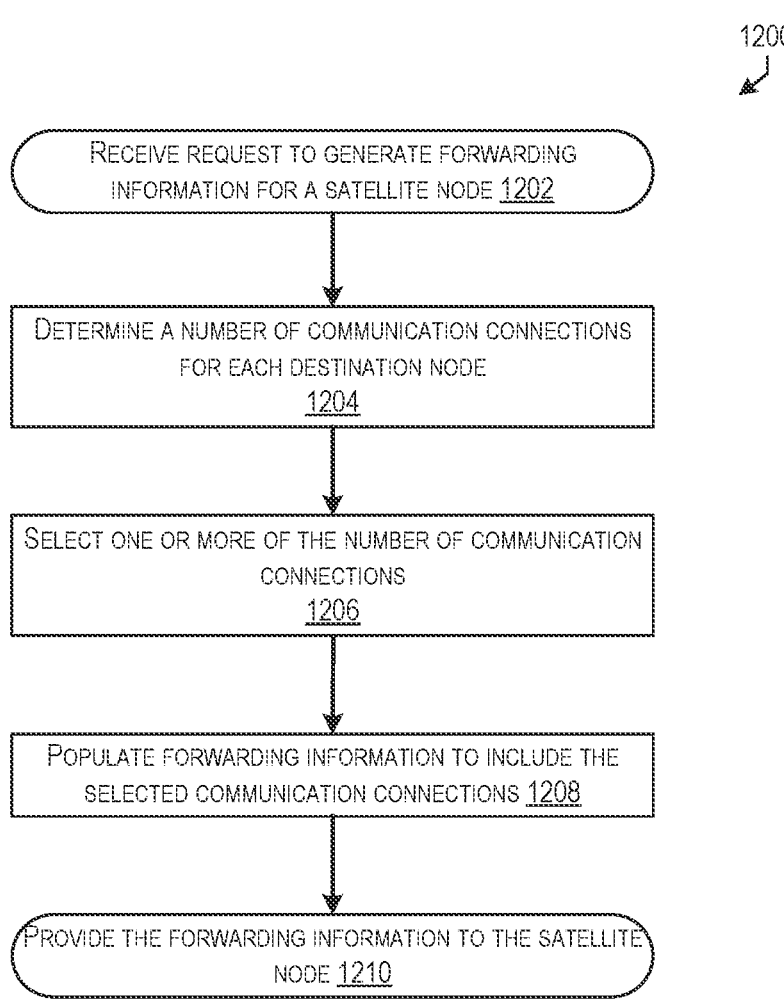

RECEIVE REQUEST TO GENERATE FORWARDING
INFORMATION FOR A SATELLITE NODE 1202

DETERMINE A NUMBER OF COMMUNICATION CONNECTIONS
FOR EACH DESTINATION NODE
1204

SELECT ONE OR MORE OF THE NUMBER OF COMMUNICATION
CONNECTIONS
1206

POPULATE FORWARDING INFORMATION TO INCLUDE THE
SELECTED COMMUNICATION CONNECTIONS 1208

PROVIDE THE FORWARDING INFORMATION TO THE SATELLITE
NODE 1210

FIG. 12

TECHNIQUES FOR IMPLEMENTING LEO SATELLITE NETWORKS

TECHNICAL FIELD

The present disclosure relates generally to communications of data over satellite networks. More particularly, the present disclosure relates to the use of satellites in the satellite networks to route communications to terrestrial-based computing devices.

BACKGROUND

Wide area networks, or "WANs," are telecommunication networks that connect and enable computing devices to communicate over large geographic areas. Computing devices use WANs, such as the Internet, to communicate with each other over large distances on a daily basis. Generally, WANs are used to connect local area networks (LANs) with each other using edge or border routers, which are devices that route packets over lines that span between LAN locations. A classic example of a use case for a WAN is to connect an enterprise LAN network over a large geographic area to services hosted in a datacenter.

More recently, Software-defined WANs (SD-WANs) have been introduced to help make WAN architectures easier to deploy, operate, and manage. SD-WAN technologies utilize virtualization, application-level policies and overlay networks, and software platforms to increase data-transfer efficiencies across WANs by moving traffic to lower-cost network links to do the work of more-expensive leased lines. Various WAN and SD-WAN technologies are used to communicate data packets between devices and across WANs. For instance, these technologies include packet switching methods, Transport Control Protocol (TCP), Internet Protocol (IP), overlay networks, Multiprotocol Label Switching (MPLS) techniques, and so forth. Using these technologies, a first router can connect a first LAN over a WAN with a second router located within a second LAN.

Traditionally, the networking infrastructure used to communicate data between routers and across WANs is fairly static. That is, while networking components might be spun up or spun down to scale with traffic demand in a WAN, the locations and networks in which the network components are located, as well as the wired and/or wireless connections between the components, are fairly static. In this way, the communication protocols used by networking components to communicate over WANs were designed with the luxury of a fairly static and stable infrastructure as far as geographic location and distance is concerned.

While WAN networks are effective in delivering network connectivity to most users, there are many users in remote locations, unsupported countries or regions, and/or other areas that do not have reasonable access to WAN networks. Accordingly, various enterprises and organizations have developed and deployed satellite WAN networks that are composed of hundreds or thousands of satellites that orbit earth.

Satellite networks are able to provide WAN connectivity to these remote or unsupported users because all that is required is a satellite dish, a router, and a clear line of sight to one or more of the orbiting satellites. The router uses the satellite dish to transmit satellite signals, or "beams," to an orbiting satellite, which then relays the signal to another satellite in the network and/or another router associated with a destination of the signal. Some of the original satellite communication networks are geosynchronous in operation in that the satellites orbit the Earth at roughly the same speed as the Earth itself. However, geosynchronous satellites are located at a fairly high altitude above the Earth (e.g., 40,000 kilometers (km)), which results in limited bandwidth and poor performance as the round-trip-time is long and limited by the speed of light.

More recently there has been an emergence of Low Earth Orbit (LEO) satellite constellations which are satellite networks that consist of thousands of small satellites in low Earth orbit (e.g., 500 km in altitude). LEO satellites are constantly moving relative to the Earth, and thus constantly moving relative to routers and satellite dishes on Earth. The satellites in these LEO satellite networks are arranged in a shell (e.g., a grid or constellation) that move in unison according to predefined patterns or orbital paths. Each shell may include thousands, or tens of thousands, of LEO satellites. In essence, a given satellite network consists of several such shells, each of which include many orbital planes. Given that satellites in different shells have distinct altitudes, they will have to maintain different speeds (often in excess of 25,000 km/h). In addition, satellites on different orbital planes will traverse the sky in paths that cross each other at different angels. Given these issues, it should not be surprising that LEO satellite networks are prime examples of highly dynamic networks. The nodes within these networks will experience time-varying adjacencies, as well as dynamic costs over the duration of each adjacency. These LEO satellite networks provide improved bandwidth, reduced latency, and smaller spot coverage due to lower altitude of the satellites as well as the movement of the satellites relative to locations on Earth.

As noted above, communication protocols used in WAN networks have been designed for WAN infrastructures with network components and communication paths that are largely static, or stationary. However, LEO satellite networks include grids of satellites that are constantly moving relative to the routers and satellite dishes on Earth with which they communicate. These traditional communication protocols were not designed or optimized to communicate across WANs with moving network components. Further, because the speed of light propagates faster in a vacuum, such as outer space, communications routed across the satellites in a LEO satellite network may be faster than the same communications when routed across a terrestrial network. Accordingly, it may be preferred for a communication to traverse the LEO satellite network to the greatest extent possible before being returned to Earth. Hence, it may be beneficial to route signals between satellites until the signal reaches a satellite closer to the destination device on Earth for transmission back to Earth. However, because the satellites are in a grid that moves along orbital paths, distances between satellites are constantly changing as the satellites move along their respective paths. Accordingly, as the signal is passed off between satellites with varying differences in distances, there are resulting variances in delays and potentially higher packet loss. Therefore, communication protocols may not be properly designed or optimized to handle communications over LEO satellite networks which may result in performance degradation of the communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 depicts techniques for determining a destination satellite in accordance with at least some embodiments.

FIG. 9 illustrates a flow chart depicting a process for generating a forwarding table to be provisioned onto a satellite node in accordance with at least some embodiments.

FIG. 10 illustrates a flow diagram depicting an exemplary process for routing communications across a satellite network in accordance with at least some embodiments.

FIG. 11 illustrates a flow diagram depicting an exemplary process for routing communications across satellite nodes within a satellite network in accordance with at least some embodiments.

FIG. 12 illustrates a flow diagram depicting an exemplary process for generating and distributing forwarding tables to satellite nodes to be used in routing communications across a satellite network in accordance with at least some embodiments.

DESCRIPTION OF EXAMPLE EMBODIMENTS

Overview

A first method according to the techniques described herein may include receiving, at a first ground station computing device, a request to determine destination information for a service/server targeted via a communication. The method may further involve determining, based on information about the service/server, a target computing device to which the communication is to be routed, and determining, based on the target computing device, a location of a destination ground station. The method may further involve determining, based on the location of the destination ground station, at least one destination satellite. Once a destination satellite has been determined, the method may involve generating the destination information to include at least one address for at least one destination satellite and providing the destination information in response to the request.

Additionally, the techniques described herein may be performed by a system and/or device having non-transitory computer-readable media storing computer-executable instructions that, when executed by one or more processors, performs the method described above.

Example Embodiments

This disclosure describes techniques that may be performed to enable routing of data packets over a LEO satellite network. In such techniques, a terrestrial-based computing device (e.g., a ground station computing device) may perform routing calculations for satellite nodes included in a LEO satellite network. This may involve performing path selection for each node on an ongoing basis to enable routing of data packets across the LEO satellite network as configurations of the network changes. Path selections calculated by the computing device are indicated within forwarding tables that are provisioned onto the satellite nodes. Each satellite node may perform simple routing operations by routing the packets towards an ultimate destination node by transmitting them to a neighboring satellite node based on the respective forwarding tables.

Figure 1:
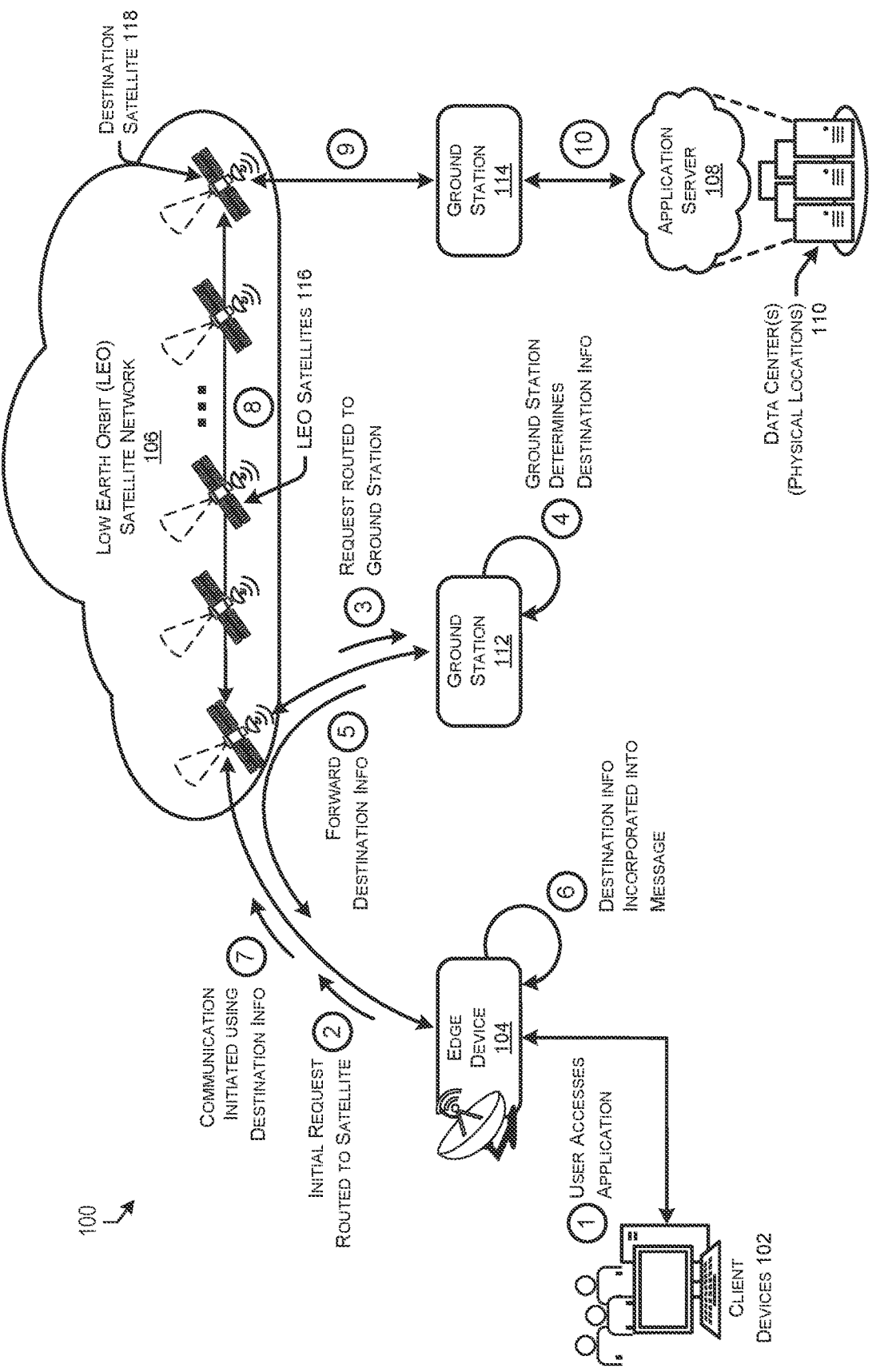
FIG. 1 illustrates a system-architecture diagram of an example environment that includes a LEO satellite network over which a client device utilizes a router and satellite dish to communicate with an application server.

FIG. 1 illustrates a system-architecture diagram 100 of an example environment that includes a LEO satellite network over which a client device utilizes a router and satellite dish to communicate with an application server.

The system-architecture diagram 100 illustrates one or more client devices 102 that are configured to communicate, via an edge device 104 and through a LEO satellite network 106, with an application server 108 hosted in one or more data centers 110.

The client devices 102 may comprise any type of computing device configured to communicate using various communication protocols (e.g., short range protocols, TCP/IP, User Datagram Protocol (UDP), tunneling protocols, and/or any other protocol) over various networks. For instance, the client devices 102 may comprise one or more of personal user devices (e.g., desktop computers, laptop computers, phones, tablets, wearable devices, entertainment devices such as televisions, etc.), network devices (e.g., servers, routers, switches, access points, etc.), and/or any other type of computing device.

An edge device 104 may include any electronic device that provides an ingress/egress point for a network, such as a terrestrial network that includes the client device 102. The edge device 104 may act as a router for communications originating at the client device. An example of an edge device 104 may include a router, routing switch, integrated access device, multiplexer, or any other suitable device. The edge device 104 may include one or more processors and a memory that stores computer executable instructions for implementing at least a portion of the functionality described herein. In some cases, the edge device may be in communication with, or include, a satellite antenna that enables communication between itself and the LEO satellite network 106. As noted above, the edge device 104 may reside in a terrestrial network that includes any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs) —both centralized and/or distributed—and/or any combination, permutation, and/or aggregation thereof.

As illustrated, a LEO satellite network 106 may include a plurality of LEO satellites 116 (e.g., hundreds or thousands of satellites). The satellites in the LEO satellite network 106 may consist of thousands of satellites in low Earth orbit (e.g., 500 km in altitude). The LEO satellite network 106 may be constantly moving relative to the Earth, and thus constantly moving relative to the edge device 104, ground station 112, and ground station 114 located on Earth. The satellites 116 in the LEO satellite network 106 may be arranged in a grid (or constellation) and move in unison according to predefined patterns or orbital paths. These LEO satellite networks 106 may provide improved bandwidth, reduced latency, and smaller spot coverage due to the lower altitude of the satellites 116 as well as the movement of the satellites 116 relative to locations on Earth. The satellites 116 in the LEO satellite network 106 may handoff (e.g., forward) signals between the satellites 116 until the signals reach a satellite 116 closer to the destination device on Earth for transmission back to Earth. In some examples, the satellites may be arranged in a grid that moves according to orbital paths, and in such examples, the distances between the satellites 116 are constantly varying as the satellites 116 move along their respective paths.

To communicate over LEO satellite network 106, the client devices 102 generally need to send the data they would like communicated to an edge device 104 that utilizes an antenna (e.g., a satellite dish) to transmit the signals to a satellite 116 in the LEO satellite network 106. In some examples, a provider or controller for the LEO satellite network 106 may provide users, often customers, with the required routers and/or satellite dishes (e.g., the edge device 104) to enable users to communicate over the LEO satellite network 106 using their client devices 102. In some embodiments the client devices 102 are configured to communicate using any suitable communication protocols, such as the TCP/IP suite of communication protocols.

Implementation of the environment 100 allows client devices 102 to be able to access data hosted at the application server 108 over the LEO satellite network via a process as described below.

At step 1 of such a process, a user of an application on the client device 102 may start/open the application, and the application may begin establishing a connection (e.g., TCP/IP) over a terrestrial network (e.g., a LAN) with the edge device 104. The edge device 104, upon receiving the request, identifies one or more satellites in the LEO satellite network 106 that are in communication range of the edge device 104.

At step 2, upon determining a satellite in communication range, the edge device 104 may route (e.g., uplink) an initial request for resolution to that satellite that includes an indication of at least the application to be accessed. The initial request for resolution may be a request for Domain Name Server (DNS) resolution. In some cases, the initial request for resolution may be identified as an initial request for resolution via a resolution request indicator included in the message, which might consist of a single bit (e.g., "1" indicates an initial request for resolution, and "2" indicates a standard communication, or vice versa). In some cases, the edge device 104 may provide an indication of an identifier for the client device 102 or any other suitable information.

At step 3, the satellite that receives the initial request for resolution may route (e.g., downlink) that request to a ground station 112 in communication range of the satellite. In some cases, the ground station 112 may be geographically proximate to the edge device 104, such that the satellite is capable of being in communication range of both simultaneously. It should be noted that while FIG. 1 depicts an embodiment in which the initial request for resolution being relayed to the ground station 112 via a satellite in the LEO satellite network, the initial request for resolution may, in other embodiments, be routed to the ground station via a terrestrial (e.g., earthbound) network connection when available.

At step 4, the ground station 112 may, upon receiving the initial request for resolution, determine destination information to be used in routing packets between the edge device 104 and the application server 108. In embodiments, each ground station maintains information about orbital paths/trajectories for each of the satellites in the LEO satellite network 106. Additionally, each ground station may further maintain information about each of the ground stations that includes the location of the respective ground station as well as data centers associated with (in communication with) those grounds stations. The ground station 112, in order to determine the destination information, may first perform a lookup operation to identify the ground station 114 associated with the application server to be accessed. The destination information may include any combination of an address of at least one destination satellite 118, an address of the ground station 114, and an address of the destination server (hosting the application server).

Once the ground station 114 has been identified, a physical location of that ground station is used, along with the information about satellite orbital paths/trajectories to determine a destination satellite 118 closest to the ground station 114. Destination information generated in this way may include an address (e.g., an internet protocol (IP) address) associated with the destination satellite 118. In some embodiments, the destination satellite 118 may be a satellite closest to the ground station 114 at a particular point in time (e.g., currently). In these embodiments, the destination information may include a single address associated with the destination satellite 118. In some embodiments, the destination satellite 118 may include multiple satellites. For example, the destination satellite 118 may include a sequence of different satellites at different points in time. in these embodiments, the destination information may be generated to include a series of addresses, each of which is associated with a time or period of time.

At step 5, the ground station 112 transmits the destination information back to the satellite, which then routes that destination information back to the edge device. In some embodiments, the ground station 112 may periodically transmit new destination information to the edge device 104 as the destination satellite 118 is updated. For example, the ground station 112 may receive an indication that the communication between the client devices 102 and the application server is approaching a threshold amount of time, past which the previously provided destination information will be outdated. In this scenario, the ground station 112 may determine and provide new destination information to the edge device 104 automatically.

At step 6, the edge device 104 may use the destination information to establish a communication session between the client device 102 and the application server 108 over the LEO satellite network 106. To do this, the edge device 104 inserts an address included in the destination information into communications (e.g., within a header) originating from the client device 102 and directed toward the application server. In embodiments in which the destination information is a series of addresses, the edge device 104 may insert an address associated with the current time period into the communication. As time advances, the edge device 104 may be configured to insert a second address into communications upon reaching a point in time at which the destination satellite 118 has changed.

At step 7, the edge device 104 forwards the communications including the address to the LEO satellite network 106. Particularly, the edge device 104 may forward the communications to any satellite in the LEO satellite network 106 capable of receiving the communication (e.g., in communication range) at any given time.

At step 8, the satellites in the LEO satellite network 106 may route the communication to the destination satellite 118 using routing techniques that are described in greater detail below. To do this, each of the satellites in the LEO satellite network use dynamic forwarding tables to determine a next hop (e.g., a subsequent satellite) to receive the communication until the destination satellite 118 is reached. In embodiments, each of the satellites in the LEO satellite network 106 act as simple switches, conveying the communication (e.g., by forwarding packets of the communication) to the next satellite without performing significant processing.

At step 9, the destination satellite, upon receiving the communication, transmits the communication to the ground station 114. At step 10, the ground station 114 may convey the communication to the data center 110 hosting the application server 108. In some cases, the ground station 114 may convey the communication to the data center 110 over a terrestrial network.

Although the techniques of FIG. 1 are described with reference to client devices 102 communicating with an application server 108, the techniques are generally applicable for any devices that communicate across a LEO satellite network 106. Additionally, while the techniques are described with respect to a client device 102 reaching out to, for example, a service hosted on an application server 108, the techniques are also applicable for the reverse situation where the application server 108 is reaching out or initiating a conversation with the client devices 102.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
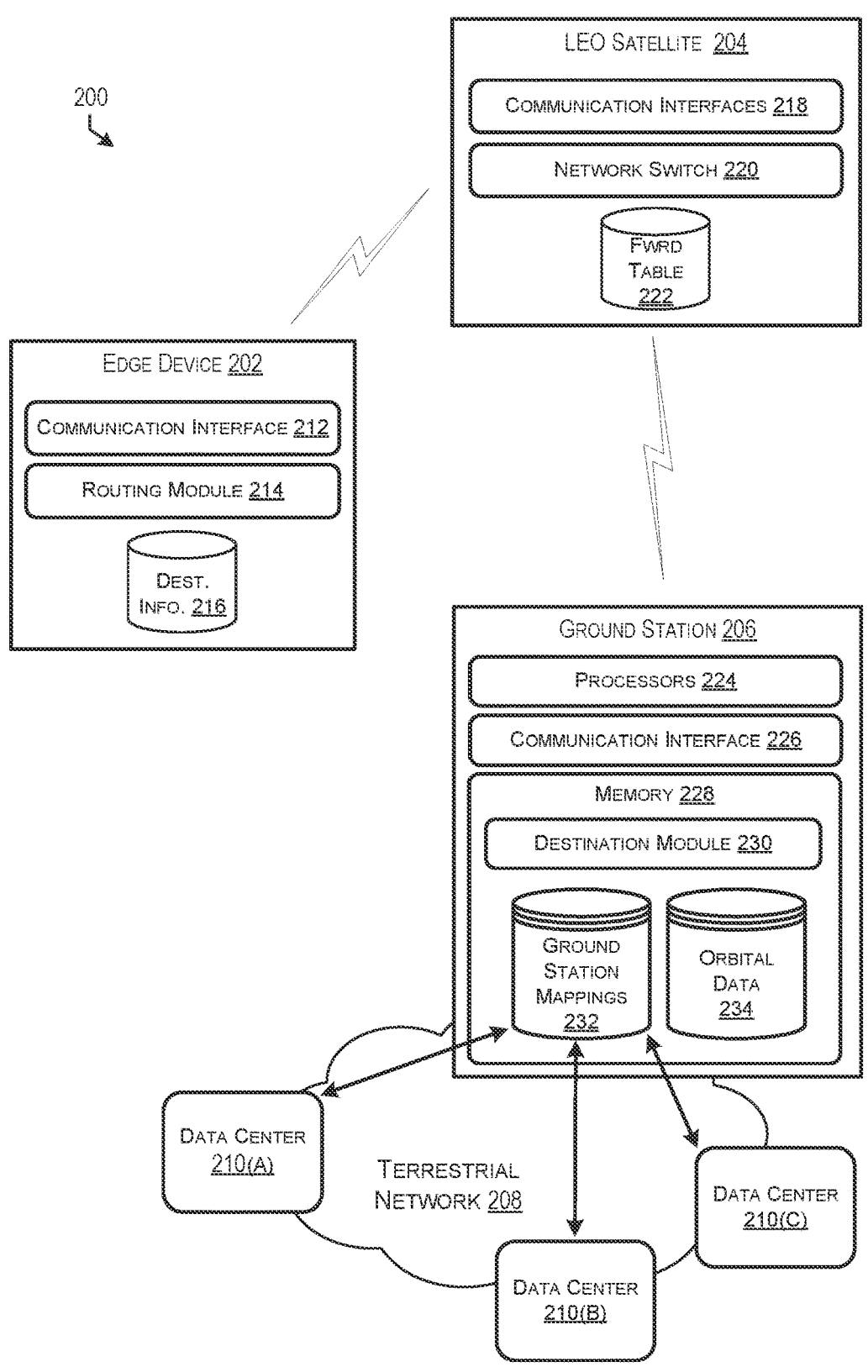
FIG. 2 depicts an example architecture of a system for enabling communication over a LEO satellite network in accordance with at least some embodiments.

FIG. 2 depicts an example architecture of a system for enabling communication over a LEO satellite network in accordance with at least some embodiments. As shown in FIG. 2, an edge device 202 may be in communication with a number of LEO satellites 204 in a LEO satellite network. The LEO satellites may be further in communication with one or more ground station 206. The ground station 206 may be act as an egress/ingress point for a terrestrial network 208, over which a number of data centers 210 (A-C) may be in communication with the ground station 206.

An edge device 202 may include any electronic device that provides an ingress/egress point for a network (e.g., a local area network (LAN)). In some embodiments, the edge device 202 may act as a Transport Control Protocol (TCP) proxy for a client computing device. An example of an edge device 202 may include a router, routing switch, integrated access device, multiplexer, or any other suitable device. The edge device 202 may include one or more processors and a memory that stores computer executable instructions for implementing at least a portion of the functionality described herein. The edge device 202 may include a communication interface 212 for enabling communication between the edge device and one or more networks. The edge device 202 may further include a routing module 214 configured to route messages between one or more client devices via a local network and a LEO satellite network. The edge device 202 may receive and store destination information 216 (e.g., from a ground station) to be used in routing communications.

The communication interface 212 may be any component configured to enable data to be communicated between electronic devices. The communication interface 212 may include one or more network interface controllers (NICs) or other types of transceiver devices to send and receive messages over network(s). For instance, the communication interface 212 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the communication interface 212 may include a wide area network (WAN) component to enable message over a wide area network. The communication interface 212 may be in communication with a long-range antenna, such as a satellite dish antenna.

A LEO satellite 204 may include any electronic device capable of maintaining a low-Earth orbit and performing packet switching/routing. A number of LEO satellites may act as computing nodes in a LEO satellites network. Each LEO satellites 204 may include one or more communication interfaces 218 and a network switch 220. Each LEO satellite 204 may maintain a forwarding table 222 that is specific to that LEO satellite 204. The network switch 220 may include any hardware and/or software that relays or forwards communications between devices on the network by using packet switching to receive and forward data to its intended destination.

A forwarding table 222 may include any suitable indication of a path along which communications (e.g., packets) are to be routed. In some embodiments, the forwarding table 222 may be, or may be similar to, a forwarding table used in Multiprotocol Label Switching (MPLS) routing. MPLS routing is a technique that routes traffic using the shortest path based on "labels," rather than network addresses, to handle forwarding within a network. As a scalable and protocol-independent solution, MPLS assigns labels to each data packet, controlling the path the packet follows and greatly improves the speed of traffic, so users don't experience downtime when connected to the network. An exemplary forwarding table dictates how the LEO satellite handles received packets. When a packet arrives at the LEO satellite, the LEO satellite looks up the outermost label of the received packet in the relevant forwarding table. In embodiments, the entries in the forwarding table map labels to next hops.

A ground station 206 may be any computing device configured to act as a point of ingress/egress between a LEO satellite of a LEO satellite network and a terrestrial network 208 that is connected to one or more data centers 210. The ground station may be configured to route communications between one or more application server and a client device accessible over the LEO satellite network. In some embodiments, the ground station 206 is further configured to perform DNS resolution for communications originating from an edge device 202. An exemplary ground station 206 may include a number of hardware components, including at least one or more processors 224, a communication interface 226, and a memory 228.

As used herein, a processor 224 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory 228 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 224.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 226, the I/O devices of the respective apparatuses, and so forth, and provide various services to applications or components executing on the processor(s) 224. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California;

Operating System Embedded (ENEA OSE) as promulgated by ENEA AB of Sweden; and so forth.

Turning to the contents of the memory 218 in more detail, the memory 218 may include an operating system and one or more application programs or services for implementing the features disclosed herein including at least a module for determining an appropriate destination address to be included in communications (e.g., destination module 230). The memory 228 may further include ground station mapping data 232 that includes information about various data centers in communication with particular ground stations, as well as orbital data 234 that includes information about predicted positions of various LEO satellites at different times. For example, each ground station 206 may include a service registry component that is used by nearby servers (e.g., data centers 210) to register themselves. Different ground stations will exchange this information through a Control Plane (CP) or a Management Plane (MP), which will eventually give them a global view of destination servers as associated with particular ground stations. In addition, all ground stations have access to a Satellite Location Table (e.g., orbital data 234), which tells them which satellite is closest to them at any given time.

The destination module 230 may be configured to, on execution by the processor 224, receive a communication (e.g., an initial request for resolution communication) from an edge device for destination resolution and determine, in relation to that request, a destination satellite (e.g., 118) to which future communications by the edge device should be routed. To do this, the destination module 230 may determine a destination data center 210 to which the message is intended to be sent. In some embodiments, the destination data center 210 may be determined based on one or more applications hosted by the data center, where the request is a request to access an application. In some cases, each application to be accessed may be hosted on a number of different data centers that are geographically distributed. In these cases, the destination module 230 may be configured to, upon receiving a request to access the application, select an appropriate data center 210 from the number of different data centers that host the application as the destination data center. This selection of a data center as the destination data center may be made based on any suitable factor, such as proximity to an edge device from which the initial request for resolution originated, bandwidth of a network to which the data center is connected, number of devices currently accessing the data center, etc.

Upon identifying a destination data center 210, the destination module 230 may be configured to determine, from information included in ground station mapping data 232, a destination ground station 206 capable of communicating with the destination data center 210. Once the destination ground station 206 has been determined, at least one destination LEO satellite 204 may be identified based on orbital data 234. Note that this is described in greater detail with respect to FIG. 3 below.

Upon determining a destination LEO satellite 204, the destination module 230 may be configured to provide destination information in response to the initial request for resolution that includes any combination of an address for the destination LEO satellite 204, an address for the destination ground station 206, and/or an address for the destination data center 210. The destination module 230 may then transmit the destination information to a LEO satellite 204 in communication range to be conveyed back to an edge device (e.g., edge device 104) from which the initial request for resolution originated. Note that, as discussed elsewhere, the address for the destination LEO satellite 204 may include a list of destination LEO satellites at specified periods of time.

The ground station mapping data 232 may include information about one or more data centers 210 in communication with each different ground station 206 via a respective terrestrial network 208 (e.g., the Internet). It should be noted that the terrestrial network may connect multiple different ground stations 206, and hence each data center 210 may be in communication with multiple ground stations. In embodiments, the ground station data may include an indication of a particular ground station 206 to be used to access a particular data center.

In some embodiments, the ground station mappings 232 may assign each data center 210 to a respective ground station 206 based on a physical location of that data center in relation to a physical location of the respective ground station. For example, each data center to be accessed using the LEO satellite network may report its physical location to one or more ground station 206. In this example, a calculation is then made as to the closest (in physical proximity) ground station to that data center, which is then assigned to that data center in a corresponding mapping.

In some embodiments, the ground station mappings 232 may further include an indication of a score (e.g., a rank or priority) associated with each mapping of a data center to a ground station 232. Such a score may be calculated based on metrics obtained in relation to a communication path between a respective ground station and a respective data center. For example, each ground station 206 may send a network probe (e.g., a HTTP HEAD requests or a TCP ping) to the respective data center 210. In this example, metrics may then be obtained in response to the network probe. Such metrics may include, but are not limited to, key performance indicators (KPIs) such as loss, latency, jitter, etc. A score may then be calculated as a numeric representation of the collected metrics. In the above example, each mapping of a particular ground station to a particular data center is ranked (e.g., ordered) according to its respective score.

In embodiments, information generated as ground station mapping data at each of the respective ground stations may be aggregated by a centralized entity (e.g., one of the ground stations or a separate entity) and subsequently distributed to each of the ground stations to be stored as ground station mapping data 232. In some cases, different ground stations may provide an indication of a connection to the same data center. In these cases, the ground station having the best connection (e.g., as determined based on a corresponding score) may be associated with that data center via a respective mapping.

The orbital data 234 may include any information pertaining to positional information for one or more LEO satellite 204 in a LEO network at any point in time. In some embodiments, the orbital data may include information about one or more orbital paths as well as information about LEO satellites that occupy the one or more orbital paths and their respective positions along the respective orbital paths. In some cases, a position of a LEO satellite 204 stored in the orbital data 234 may be represented as a set of geographic coordinates that correspond to a point on Earth over which the LEO satellite 204 is scheduled to be located at a given time. It should be noted that orbital data may be based on predicted and/or historic movements of LEO satellites. In some cases, orbital data 234 may be updated upon detecting discrepancies between the orbital data 234 and actual determined LEO satellite positions. For example, current and predicted orbital data for a LEO satellite may be updated to reflect a current position upon determining that the current position is not the same (or is over a threshold distance from) a predicted position of the LEO satellite at the current time.

The communication interface 226, similar to the communication interface 212 described above, may be any component configured to enable data to be communicated between electronic devices. The communication interface 226 may include one or more network interface controllers (NICs) or other types of transceiver devices to send and receive messages over network(s). For instance, the communication interface 226 may include a personal area network (PAN) component to enable messages over one or more short-range wireless message channels. For instance, the PAN component may enable messages compliant with at least one of the following standards IEEE 802.15.4 (Zig-Bee), IEEE 802.15.1 (Bluetooth), IEEE 802.11 (Wi-Fi), or any other PAN message protocol. Furthermore, the communication interface 226 may include a wide area network (WAN) component to enable message over a wide area network. The communication interface 226 may be in communication with a long-range antenna, such as a satellite dish antenna.

FIG. 3 depicts techniques for determining a destination satellite in accordance with at least some embodiments. The techniques are illustrated via a representation of a geographical area 302.

In the techniques shown, each of a number of ground stations may act as an ingress/egress point for a terrestrial network, providing connectivity between the terrestrial network and the LEO satellite network. As noted elsewhere, a number of ground stations may be located at known locations throughout the geographical area 302, each of which may maintain a database of ground station mappings as well as orbital data.

Orbital data may include information about a number of orbital paths for the satellites within the LEO satellite network. For example, the orbital data may include an indication of a number of orbital paths 304, each of which include a predicted location of a satellite in the network throughout a period of time into the future. In some cases, multiple satellites of the LEO satellite network may travel along the same orbital path 304. Accordingly, the orbital data may include an indication of a number of satellites positioned following each other along a particular orbital path.

Upon receiving a request to access an application hosted on a particular application server, the ground station identifies, based on the ground station mapping data, a target ground station associated with the data center on which that application server is hosted. Once the target ground station has been identified, a time or period of time 312 to be associated with the request is identified. In some embodiments, such a period of time may be determined based on a type of communication associated with the request. For example, a longer period of time may be identified for communication types that typically take more time. Upon identifying the target ground station, a destination location 306 may then be determined as the location of that target ground station.

Once a destination location 306 and a period of time 312 associated with the communication have been determined, the ground station processing the request may identify, based on the orbital data, one or more destination satellites within communication range 308 of the destination location 306 during the period of time. In some cases, the destination satellite might be a single satellite throughout the entirety of the period of time. In other cases, the destination satellite might be a series of satellites, each of which is within communication range of the destination location 306 for different portions of the period of time 312. In some embodiments, where multiple satellites are in range of the destination location 306 at a given time, the ground station may identify the destination satellite as the satellite having the strongest or fastest connection with the target ground station.

Upon identifying a target ground station and at least one destination satellite, the ground station processing the request may identify a first address for the target ground station as well as at least one second address for the one or more destination satellite. Destination information is then generated to include at least the first address and the second address.

By way of example, for a destination location 306 and over a period of time 312, destination satellites 310 (A-C) may each be identified as being within communication range 308 for different portions of the period of time 312. In this example, the destination information may be generated to include an address for satellite 310 (A) from time $T_0$ to time $T_1$, an address for satellite 310 (B) from time $T_1$ to time $T_2$, and an address for satellite 310 (C) from time $T_2$ to time $T_3$.

In some embodiments, in order to reduce computational resources the ground station may, when determining a destination satellite, process orbital data only for those satellites capable of communicating with the target ground station. For example, the ground station may consider only those satellites on an orbital path 304 that passes within communication range 308 of the destination location. In embodiments, it may take approximately 90 mins for a LEO satellite to go around the planet and reappear at its previous location. Hence, the list of satellites that that can reach the destination ground station (as well as the corresponding timeframes) should be reasonably small.

Figure 4:
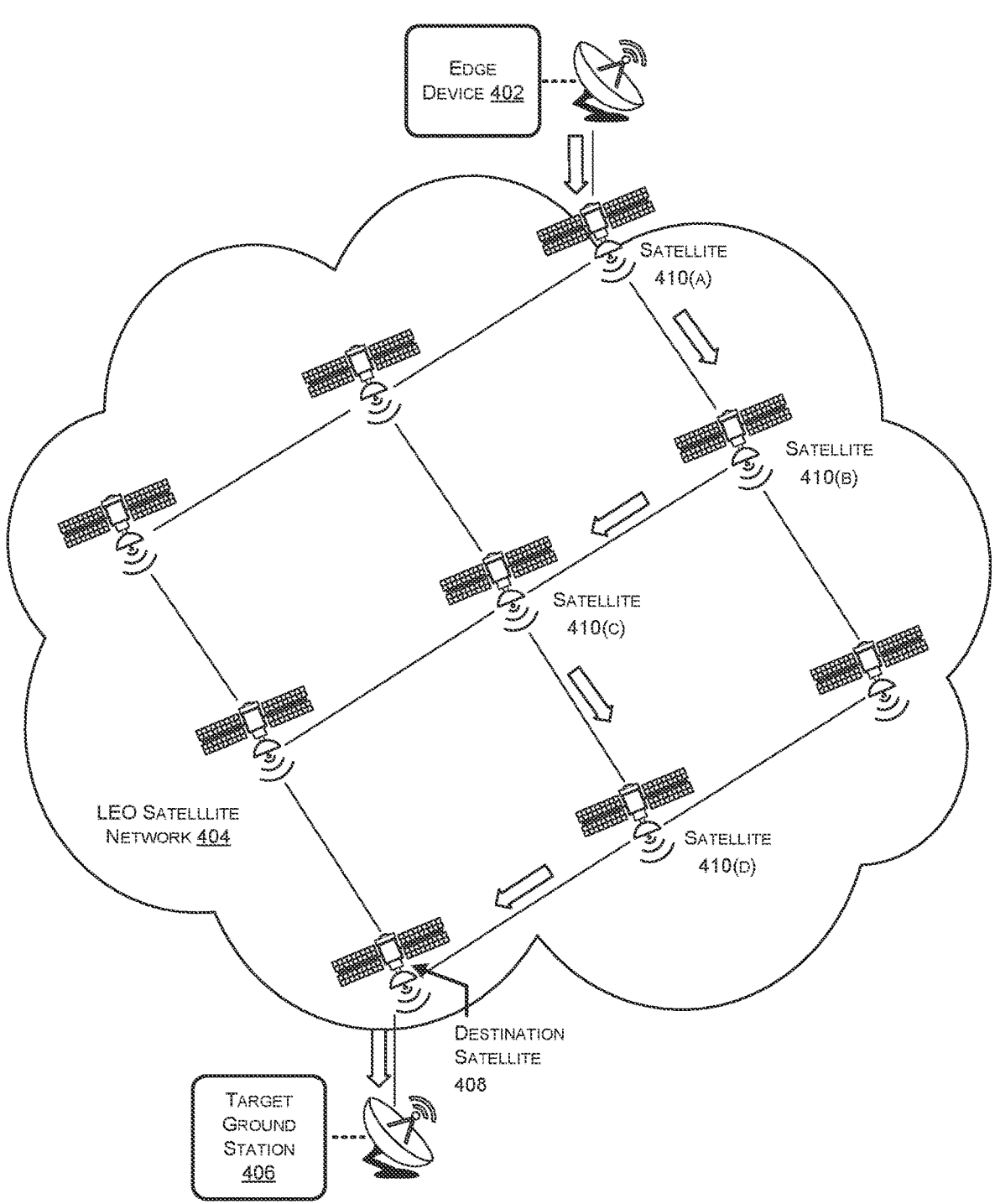
FIG. 4 depicts techniques for routing communications across a LEO satellite network in accordance with some embodiments.

FIG. 4 depicts techniques for routing communications (e.g., packets) across a LEO satellite network in accordance with some embodiments. In embodiments, a communication may be provided by an edge device 402 to the LEO satellite network 404 to be directed to a target ground station 406. The communication may include an address for the target ground station 406 as well as an address for at least one destination satellite 408. In some cases, the communication further includes an address for a server hosting an application to which the communication is directed.

Upon receiving the communication, each satellite is configured to consult a forwarding table to determine a next satellite to which the communication is to be routed and forward the communication to that next satellite. In some cases, this is done by each satellite using a dynamic forwarding table that includes an indication of a next hop for the communication based on the address of the destination satellite 408 at the time that the packet is received. In these cases, each satellite in the network may be configured to perform simple routing based on the information included in the forwarding table. In other words, the satellite may act as a simple routing switch without performing any complex routing calculations.

By way of example, upon receiving a packet from the edge device 402 directed toward the destination satellite 408, the satellite 410 (A) may perform a lookup operation in its forwarding table to determine that the packet is to be forwarded to satellite 410 (B). Satellite 410 (A) then forwards that packet to satellite 410 (B). Upon receiving the packet from satellite 410 (A), the satellite 410 (B) may perform a lookup operation in its forwarding table to determine that the packet is to be forwarded to satellite 410 (C). This is repeated in order to route the packet along the path from satellite 410 (A) to satellite 410 (B) to satellite 410 (C)

to satellite 410 (D) to the destination satellite 408. In this example, each of the satellites may only determine the next hop in the path.

Figure 5:
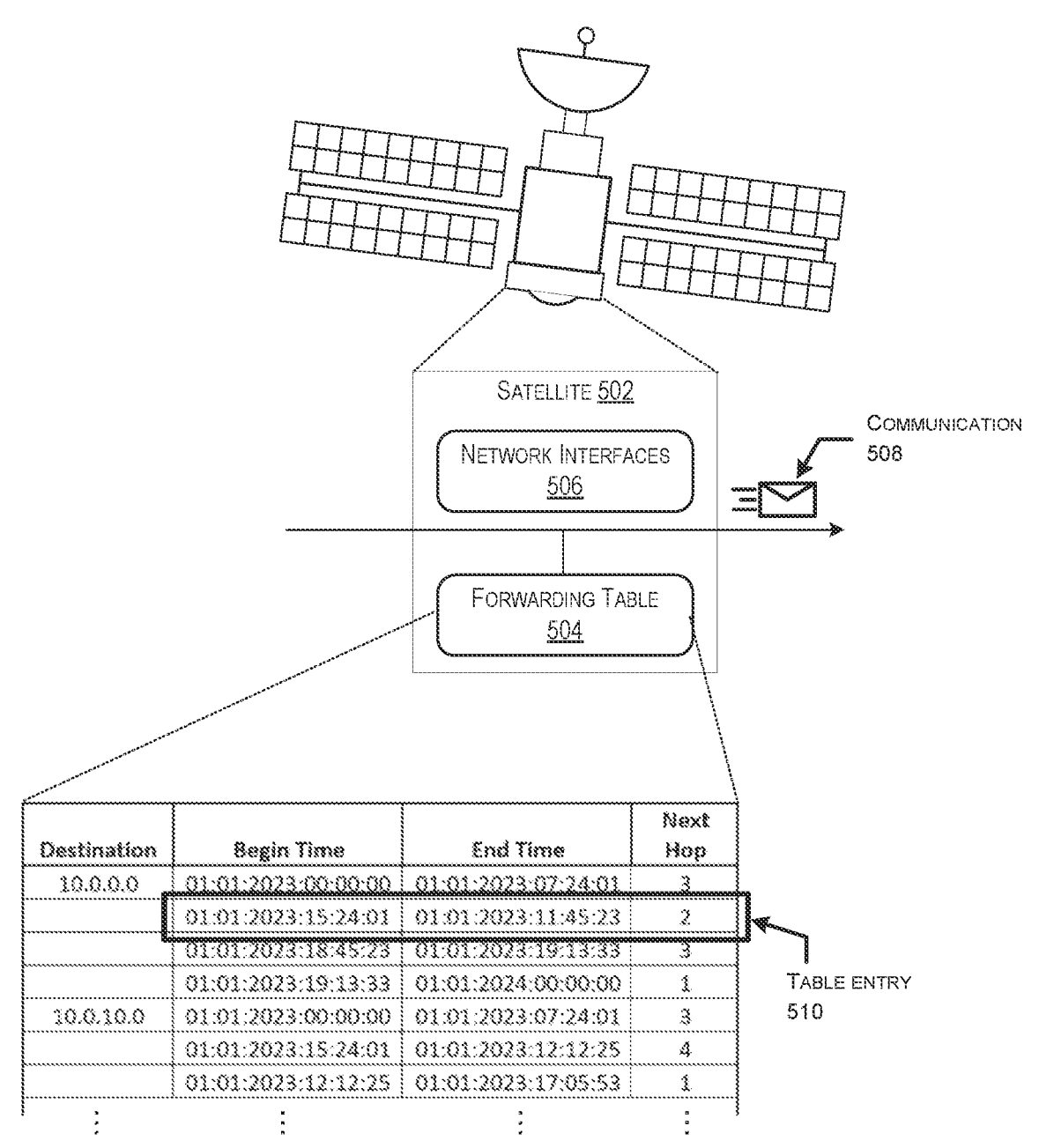
FIG. 5 depicts an example of a LEO satellite that may be included within a LEO satellite network for routing communications throughout that LEO satellite network.

FIG. 5 depicts an example of a LEO satellite that may be included within a LEO satellite network for forwarding packets throughout that LEO satellite network. In embodiments, the satellite 502 includes a forwarding table 504 and one or more network interfaces 506 configured to enable communication between the satellite 502 and a number of other satellites in the LEO satellite network. In embodiments, the satellite 502 receives a communication 508 (e.g., a packet) either from an edge device, a ground station, or another LEO satellite. If the satellite 502 is the destination satellite, as indicated in the communication 508, then the satellite 502 may be configured to convey the communication 508 to the target ground station as indicated in the communication 508.

In some cases, the packet may include a resolution request indicator that indicates the packet is intended as a request for destination information. If the packet includes a resolution request indicator indicating that the packet is intended as a request for destination information, then the satellite 502 may be configured to route that communication 508 to a ground station in communication range of the satellite 502. If the packet does not include such an indicator, then the satellite 502 may be configured to forward that communication 508 to the next satellite based on the address of a satellite to which the packet is directed.

As noted elsewhere, in order to route the communication 508 across a LEO network to the destination satellite, the satellite may consult a forwarding table 504. Particularly, the forwarding table 504 may be a table that includes at least a destination field, a time period field (e.g., a begin time and an end time), and a destination field (e.g., a next hop). The satellite may determine a table entry 510 within the forwarding table that corresponds to the next satellite to which the communication 508 is to be provided. In some cases, this may involve first identifying a number of forwarding table entries associated with the destination satellite and then identifying a single forwarding table entry within that number of forwarding table entries based on a time at which the communication 508 is received. The destination field (e.g., a next hop field) of the identified forwarding table entry is used to forward the communication 508 to the next satellite. In some cases, the satellite 502 is only in communication with a few other satellites at any given time. In these cases, each network interface of the network interfaces 506 on the satellite 502 may be in communication with a different satellite of the LEO satellite network. In those cases, the destination field may include an indication of the network interface over which the packet is to be communicated.

Figure 6:
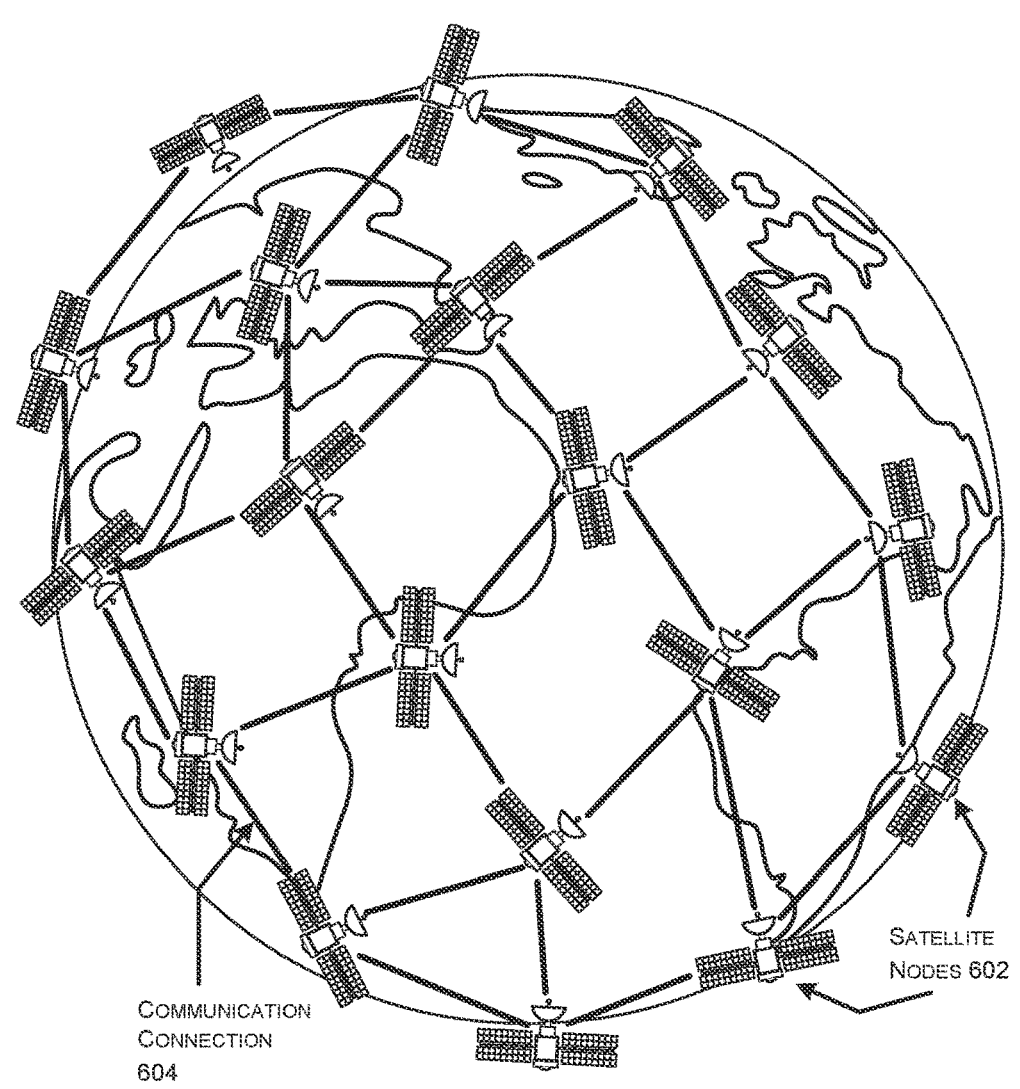
FIG. 6 illustrates aspects of an exemplary LEO satellite network that may be implemented in accordance with embodiments.

FIG. 6 illustrates aspects of an exemplary LEO satellite network that may be implemented in accordance with embodiments. As noted elsewhere, a LEO satellite network may be composed of a number of LEO satellites that act as network nodes that are configured to route packets through them.

Each of a number of satellite nodes 602 in such a network may be examples of LEO satellite 204 as described in relation to FIG. 2 above. It should be noted that the satellite nodes 602 in a LEO satellite network may be made up of a number of different types of satellite device. For example, the satellite nodes 602 may vary by make and/or model of satellite device. Additionally, the hardware and/or software included in each of the satellite nodes may vary as well as one or more functionalities/capabilities of those satellite nodes.

As depicted in FIG. 6, one or more wireless connections 604 may be maintained between each pair of satellite nodes within a given communication range. Note that a given communication range may be dependent upon the capabilities of the two satellite nodes associated with the communication connection. For example, some satellite nodes may have a longer communication range than others. In some embodiments, the communication connections 604 may be enabled via wireless communication means such as infrared communication links or other light-based communication channels. In some cases, satellite nodes may need to maintain line of sight in order to maintain the respective communication connections 604.

In embodiments, the number of communication connections 604 established, and maintained, by a particular satellite node 602 with other satellite nodes in the LEO satellite network may be dependent upon the capabilities of the respective satellite node (resulting from hardware and/or software on that satellite node). For example, the number of communication connections 604 maintained by a particular satellite node 602 may be limited based on a number of network interfaces included on that satellite node 602. In such cases, each network interface of the satellite node 602 may be used to maintain a communication connection 604 between the satellite node 602 and a different satellite node in the LEO satellite network.

In embodiments, as two satellites that maintain a communication connection 604 move out of communication range, that communication connection 604 may be severed and each of the two satellite nodes may establish new communication connections with other respective satellite nodes provided that there are in range.

As noted elsewhere, orbital data may be maintained (e.g., by each of a number of ground stations 206) that indicates positional information for each of the satellite nodes in the LEO network with respect to time. A prediction may be generated, based on relative locations of satellite nodes at a particular point in time (e.g., based on the satellites being within a predetermined range), of what communication connections 604 will exist at that point in time. Additionally, a prediction may be generated as to a second point in time (if any) at which point that communication connection will be severed (e.g., when the satellite nodes are no longer within the predetermined range).

Figure 7A:
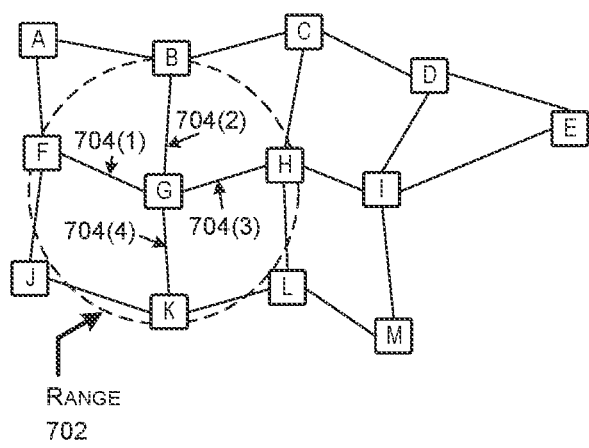
FIGS. 7A and 7B illustrate aspects of relationships between satellite nodes in a LEO satellite network with respect to time in accordance with embodiments.
Figure 7B:
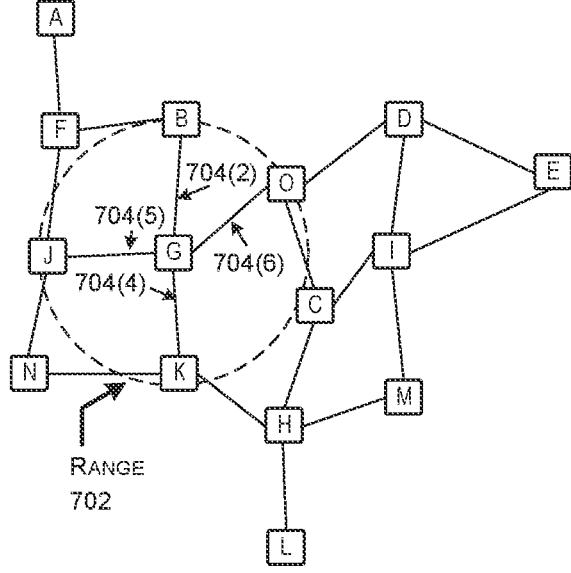

FIG. 7 illustrates aspects of relationships between satellite nodes in a LEO satellite network with respect to time in accordance with embodiments. More particularly, FIG. 7A depicts a number of communication connections between a group of satellite nodes in a LEO satellite network at a first time and FIG. 7B depicts a number of communication connections between a group of satellite nodes in a LEO satellite network at a second time.

As noted elsewhere, in order to maintain low-earth orbits, each of the LEO satellites in a LEO network may be required to maintain a certain speed (often in excess of 25,000 km/h). Because LEO satellites may maintain different altitudes and or be included in different orbital paths, the speed maintained by each satellite node may vary. Accordingly, not only are the positions of each of the LEO satellites constantly changing relative to a point on the surface of the Earth, but the positions of each of the LEO satellites are also changing with respect to each other. Satellites may come into, and exit out of, communication range 702 of one another at various times. During a period of time over which a pair of satellite nodes are within such a communication range 702, the pair of satellite nodes may establish a communication connection 704 (e.g., an example of communication connection 604 of FIG. 6).

In some cases, communication connections 704 between certain satellite nodes may remain relatively constant. For example, multiple satellite nodes may be placed on the same orbital path, but at different spots along that path. In such cases, each satellite node may maintain a communication connection with at least the satellite node directly in front of it and/or directly behind it on the orbital path. In other cases, communication connections 704 between various satellite nodes may vary over time. As noted elsewhere, communication connections 704 that will exist at a particular point in time can be determined based on a predicted relative location of each of the satellite nodes (e.g., based on maintained orbital data) in a LEO satellite network at that particular point in time.

By way of illustrating the relationships between the satellite nodes and their respective communication connections in a LEO satellite network, consider a scenario in which a group of satellite nodes A-M is predicted to be arranged in a first configuration at a first time (FIG. 7A), and predicted to be arranged in a second configuration at a second time (FIG. 7B).

As noted elsewhere, each of the satellite nodes may be associated with a communication range 702. In some cases, the communication range 702 for a particular satellite node may be based on one or more capabilities (as enabled via hardware and/or software) of that satellite node. Additionally, as pointed out elsewhere, the number of communication connections 704 that can be established by each of the satellite nodes may be limited based on one or more capabilities (as enabled via hardware and/or software) of that satellite node.

As depicted in FIG. 7A, at a first point in time $T_1$, a satellite node G may be within communication range 702 of four satellite nodes F, B, H, and K. Based on the relative proximity/arrangement of those satellite nodes, satellite node G may establish a first communication connection 704(1) between itself and satellite node F, a second communication connection 704(2) between itself and satellite node B, a third communication connection 704(3) between itself and satellite node H, and a fourth communication connection 704(4) between itself and satellite node K. Each of the communication connections 704 (1-4) may continue to be maintained until the respective satellite nodes are no longer within the communication range 702.

As depicted in FIG. 7B, at a second point in time $T_2$, a satellite node G may be within communication range 702 of four satellite nodes J, B, O, and K. Note at this second point in time $T_2$, each of satellite nodes F and H have moved out of range of satellite node G, such that the respective communication connections 704 (1 and 3) have been severed whereas new satellite nodes F and O have moved into communication range 702, such that the respective communication connections 704 (5 and 6) have been created between satellite node G and the respective satellite nodes F and O. Because the relative positions of each of the satellite nodes in the LEO satellite network can be predicted at any point in time based on orbital data stored in relation to the satellite nodes, the respective communication connections 704 that will exist at that point in time can be predicted as noted elsewhere.

Figure 8:
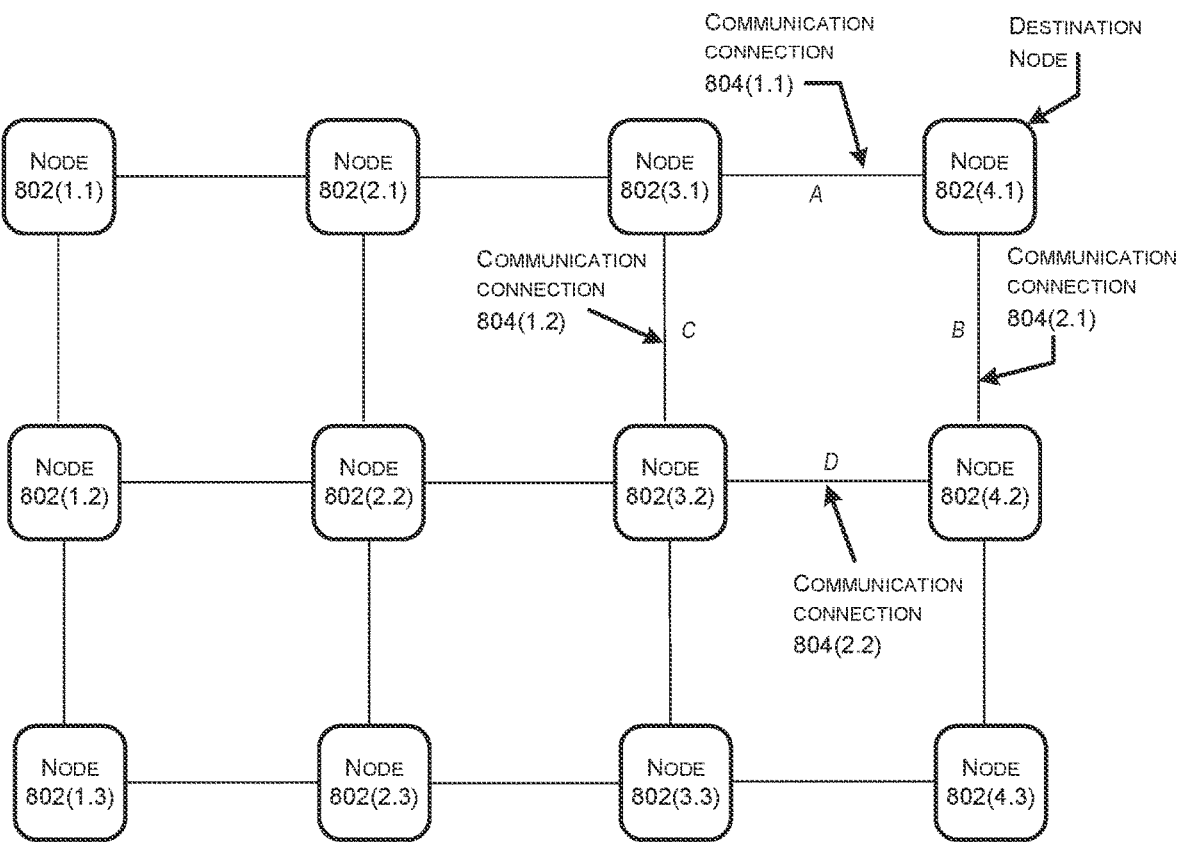
FIG. 8 illustrates exemplary path selection techniques to be used in generating dynamic forwarding tables in accordance with some embodiments.

FIG. 8 illustrates exemplary path selection techniques to be used in generating dynamic forwarding tables in accordance with some embodiments. For illustrative purposes, a number of nodes (1.1-4.3) (e.g., satellite nodes) are depicted as being arranged in an array (e.g., four columns and three rows). However, it should be noted that such nodes may be arranged in any suitable configuration.

In embodiments, a number of communication connections 804 may be established between each of a number of pairs of nodes 802 in communication range of each other. In some cases, each communication connection 804 established between a pair of satellite nodes may be assigned a score (e.g., a weight or ranking). Such a score may be determined based on characteristics of the communication connection 804 itself and/or characteristics of the satellite nodes 802 between which the communication connection 804 is established. For example, nodes that are closer in proximity may be assigned a more optimal (e.g., a lower or higher score depending on what is optimal) than nodes that are further in proximity. In some embodiments, the score may account for a type or model of the respective nodes communicating. For example, nodes of a type having a higher bandwidth or faster communication routing speed may be assigned a more optimal (e.g., higher or lower score). In some cases, the calculation of a score for a communication connection 804 may further take into account a duration for which the communication connection 804 is expected to exist, such that communication connections having a longer duration are caused to be selected more frequently (e.g., in order to minimize/reduce changes in routing data).

As described herein, forwarding information may be determined for each node 802 in a network of nodes at a particular period of time based on available communication connections 804 and their respective scores. By way of illustration, consider a scenario in which forwarding information is generated for each of the nodes (1.1-4.3) to reach a destination node 802(4.1) within that group of nodes. In this example, nodes 802(3.1) and 802(4.2) may be determined to be in direct communication with the destination node 802 (4.1) via respective communication connections 804 (1.1) and 804 (2.1). In this example, each of the communication connections 804 (1.1) and 804 (2.1) may be assigned a score that corresponds to a numeric representation of a weight or ranking for the respective communication connection.

As noted elsewhere, a score may be calculated for each communication connection based on a function provided with any suitable factor. For example, the score may be calculated based at least in part on KPI metrics collected (e.g., historically) or predicted for the respective communication connection. In some cases, the score may be calculated based at least in part on a communication means (e.g., hardware and/or software) used to establish the respective communication connection. In some cases, the score may be calculated based at least in part on a calculated distance (or average distance over a period of time) between the two nodes. In some cases, the score may also factor in information about the node 802 to which the communication connection connects.

To generate a forwarding table to be used by a particular node in routing communications (as described in greater detail with respect to FIGS. 4 and 5), a communication connection 804 having the most optimal (e.g., lowest or highest) score may be selected. In the case that a node 802 is a single hop away from the destination node, the forwarding table may be generated to forward the packets directly to the destination node 802 (4.1). For example, when generating a forwarding table for node 802 (3.1) to forward packets to the destination node 802 (4.1), a next hop field of the forwarding table may be populated with an indication of the communication connection 804 (1.1) (or a network interface used to establish the communication connection 804 (1.1)). Likewise, when generating a forwarding table for node 802 (4.2) to forward packets to the destination node 802 (4.1), a next hop field of the forwarding table may be populated with an indication of the communication connection 804 (2.1) (or a network interface used to establish the communication connection 804 (2.1)). In some cases, this selection of the next hop may be made regardless of the score assigned to the communication connection to be used. It should be noted that even if the score for the communication connection is not used to select a next hop, information about that score may be stored in relation to each node. For example, information may be stored indicating that the communication connection 804 (1.1) is assigned a score A, and communication connection 804 (2.1) is assigned a score B.

In the case that a node 802 is multiple hops away from the destination node, the forwarding table may be generated to forward packets to another node based on a cumulative score of the communication connections (and other nodes) along a particular path. For example, a determination may be made as to whether a first path along communication connections 804 (1.2) having a score of (and 804 (1.1) having a score of A is more or less optimal than a second path along communication connections 804 (2.2) having a score of D and 804 (2.1) having a score of B. In some cases, this may involve generating an overall score for each path. In the previous example, the first path is assigned an overall score of A+C, whereas the second path is assigned an overall score of B+D. If the first path is determined to be more optimal than the second path, then node 802 (3.1) is selected as the next destination to which a communication to be routed to the destination node 802 (4.1) should be sent by the node 802 (3.2). Based on such a determination, a next hop field of the forwarding table for node 802 (3.2) may be populated with an indication of the communication connection 804 (1.2) (or a network interface used to establish the communication connection 804 (1.2)). Otherwise, if the second path is determined to be more optimal than the first path, a next hop field of the forwarding table for node 802 (3.2) may be populated with an indication of the communication connection 804 (2.2) (or a network interface used to establish the communication connection 804 (2.2)). This may be repeated for each node in the network, and for every potential destination node, in order to fully populate a forwarding table for those nodes. Note that such techniques may automatically favor paths having the fewest number of hops.

FIG. 9 illustrates a flow chart depicting a process for generating a forwarding table to be provisioned onto a satellite node in accordance with at least some embodiments. The process 900 may be performed by a ground station computing device, such as the ground station computing device 206 as described in relation to FIG. 2 above. In embodiments, the process 900 may be used to update forwarding tables to be used in forwarding packets in a network of satellite nodes.

At 902, the process 900 involves receiving an indication to initiate the process to generate forwarding tables for a satellite node. In some cases, this involves receiving a request to generate forwarding tables for a satellite node. In some cases, this involves initiating the process on a periodic (or scheduled) basis. In embodiments, the process 900 is performed for each of the satellite nodes in the network to generate a forwarding table specific to that satellite node. In embodiments, a forwarding table may be generated for a satellite node that is in, or about to enter into, communication range of an antenna to be used to provision the forwarding table onto that satellite node.

At 904, the process 900 involves determining a time period for the forwarding table to be generated. In embodiments, each forwarding table may be generated to include forwarding information for a specified period of time (e.g., 1 day). In these embodiments, the forwarding tables provisioned onto each satellite node may be updated at, or before, the end of each time period to include new forwarding information for the next period of time.

At 906, the process 900 involves determining a configuration of nodes by time throughout the time period. At this step, a relative location of each of the satellite nodes in the network may be determined at each point in time. Based on these relative locations, communication connections may be identified as existing between various pairs of satellite nodes in the network based on a proximity of the pair of satellite nodes (e.g., the pair of satellite nodes are within a communication range).

At 908, the process 900 involves generating the forwarding table via a subprocess 908 (A-D). As noted elsewhere, a forwarding table may include, for each potential destination node (e.g., target satellite node) in the network, a next hop based on communication timing within the period of time. The next hop may indicate a satellite node or corresponding network interface to which packets targeted at the destination node are to be forwarded.

To generate forwarding information, a subprocess may be performed for each potential destination node in a network. Note that, in some cases, every satellite node in the network may qualify as a potential destination node, such that each forwarding table generated for a satellite node includes forwarding information to any potential node in the network. The subprocess as described herein may be repeated for each of a number of potential destination nodes.

In the subprocess for generating a forwarding table, for each potential destination node, a number of available paths may be determined to that destination node at 908 (A). More particularly, at 908 (A) a number of paths may be identified each as a sequence of nodes (and corresponding communication connections) in the network that terminate at the destination node. At 908 (B) each of the number of paths may be associated with a score representing the suitability of that path for use in communication routing. At 908 (C), a path is selected from the number of paths based on the score associated with each path. At 908 (D), a data field in the forwarding table is populated with an indication of the selected path.

In embodiments, the path selection may be specific to a particular period of time. In these embodiments, each of a number of data fields in the forwarding table may be populated with an indication of a selected path for a different period of time.

At 910, the process 900 involves provisioning the forwarding table onto the satellite node. In some cases, a current forwarding table included in a memory of the satellite node is overwritten with the forwarding table generated in the process 900. In some cases, the forwarding table specific to a satellite node is provisioned onto that satellite node as the satellite node comes into communication range of a wireless antenna used to convey the forwarding table to the satellite node. For example, each satellite node on a particular orbital path that passes over a particular antenna may be provided new forwarding table information as it passes within communication range of that antenna. It should be recognized that this scenario would lead to different satellite nodes being updated with new forwarding table information at different times. In some cases, a satellite node may be updated after a specified number of orbits. For example, given that a satellite node may take around 90 minutes to complete an orbit, the forwarding table information for that satellite node may be updated every 10 orbits (e.g., every 15 hours).

FIG. 10 illustrates a flow diagram depicting an exemplary process for forwarding packets across a satellite network in accordance with at least some embodiments. While the process 1000 is depicted as a series of blocks, it should be noted that the steps described in relation to process 1000 may be performed in any suitable order. The process 1000 may be performed by a computing device, such as a ground station computing device 206 as described in relation to FIG. 2. It should further be noted that the process 1000 may be event driven (e.g., performed upon occurrence of an event) or may be performed on a periodic basis (e.g., a predetermined time intervals).

In embodiments, the process further involves at least one edge device, and a first LEO satellite is configured to relay a request received from the at least one edge device to a first ground station. In embodiments, the first LEO satellite is configured to relay the request to the computing device based on an indicator included in that request indicating that the request is an initial request for resolution At 1002, the process 1000 may involve receiving a request to determine destination information. In embodiments, the request may represent an initial request for resolution to identify address information for a communication. Such a packet may be intended for an application server hosted by a computing device (e.g., data center 110). For example, an edge device may receive a request from a user to access a Software as a service (SaaS) application hosted on the Data Center.

At 1004, the process 1000 may involve determining a target computing device associated with the request. In some embodiments, the target computing device is a computing device that hosts an application to be accessed by an edge device from which the request originated.

At 1006, the process 1000 may involve determining a location of a destination ground station associated with the target computing device. In some embodiments, this may involve determining the destination ground station associated with the target computing device and retrieving the location of the destination ground station from a database.

At 1008, the process 1000 may involve determining a destination satellite based on the location of the destination ground station. In embodiments, this involves comparing orbital data for a number of satellite nodes to the location of the destination ground station. In some embodiments, the destination satellite is determined based at least in part on a period of time associated with the session. For example, the destination satellite may be identified as one or more satellite determined to be in communication range of the destination grounds station during the period of time.

In some cases, a destination satellite comprises multiple satellites, and the address for the destination satellite comprises a series of addresses associated with individual satellites of the multiple satellites. In these cases, individual addresses of the series of addresses correspond to a different period of time.

At 1010, the process 1000 may involve generating destination information to include at least one address. The destination information includes at least the address for the destination satellite. In some embodiments, the destination information further includes at least one of an address for the destination ground station and/or an address for the target computing device.

At 1012, the process 1000 may involve providing the destination information in response to the request. In embodiments, providing the destination information in response to the request involves transmitting the destination information to the first LEO satellite to be relayed back to the at least one edge device.

FIG. 11 illustrates a flow diagram depicting an exemplary process for forwarding packets (e.g., a communication) across satellite nodes within a satellite network in accordance with at least some embodiments. While the process 1100 is depicted as a series of blocks, it should be noted that the steps described in relation to process 1100 may be performed in any suitable order. The process 1100 may be performed by a satellite node device, such as a LEO satellite device 204 as described in relation to FIG. 2. It should further be noted that the process 1100 may be performed each time that a packet is received at the satellite node.

At 1102, the process 1100 may involve receiving a packet directed to a destination satellite node. In some embodiments, an indication of the destination satellite is included in a header of the packet.

At 1104, the process 1100 may involve making a determination as to whether the current satellite node is the destination satellite node. In some embodiments, determining whether the satellite node is the destination satellite involves comparing an address of the satellite node to the address for the destination satellite At 1106, the process 1100 may involve, upon determining that the current satellite node is the destination satellite node (e.g., "Yes" from decision block 1104), the process may involve transmitting the packet to a ground station. In these embodiments, the ground station that the packet is sent to may be determined based on a ground station address included in the packet (e.g., in a header of the packet).

At 1108, the process 1100 may involve, upon determining that the current satellite node is not the destination satellite node (e.g., "No" from decision block 1104), identifying the next satellite node to forward the packet to. In embodiments, the satellite node determines the next satellite node to forward the packet to based on a forwarding table. More particularly, the satellite node may reference an entry in a forwarding table for the destination satellite node based on a current time at which the packet is received being within a time period associated with the next satellite node. In some embodiments, the satellite node is configured to receive the forwarding table from a second ground station computing device (e.g., on a periodic basis).

At 1110, the process 1100 may involve, upon determining the next satellite node to which the packet is to be forwarded, relaying the packet to that next satellite node. In some embodiments, relaying the packet to that next satellite node involves relaying the packet to a network interface associated with the second satellite node. In some embodiments, the packet is forwarded to the second satellite node via an optical link.

In some embodiments, the packet is received from an edge device and the method further comprising determining that the request is an initial request for resolution, and upon determining that the request is an initial request for resolution, transmitting the packet to a second ground station in communication range of the satellite node. In embodiments, the request is determined to be an initial request for resolution based on an indicator included in the packet. In these embodiments, the process may further involve receiving destination information from the second ground station and relaying the destination information to the edge device.

FIG. 12 illustrates a flow diagram depicting an exemplary process for generating and distributing forwarding tables to satellite nodes to be used in routing packets across a satellite network in accordance with at least some embodiments. While the process 1200 is depicted as a series of blocks, it should be noted that the steps described in relation to process 1200 may be performed in any suitable order. The process 1200 may be performed by a computing device, such as a ground station computing device 206 as described in relation to FIG. 2. It should further be noted that the process 1200 may be event driven (e.g., performed upon occurrence of an event) or may be performed on a periodic basis (e.g., a predetermined time intervals).

At 1202, the process 1200 may involve receiving a request to generate forwarding information for a satellite node in a network of satellite nodes. In some embodiments, the request is a request to update the forwarding information on a periodic basis. In some embodiments, the request is received upon determining that the forwarding information is outdated or about to become outdated.

At 1204, the process 1200 may involve determining a number of communication connections for each potential destination node in the network of satellite nodes. In embodiments, the number of communication connections are determined based on relative locations of the number of satellite nodes during the portion of the period of time. For example, each of the number of communication connections correspond to pairs of satellite nodes in the number of satellite nodes that are predicted to be within a communication range of each other during the portion of the period of time.

At 1206, the process 1200 may involve selecting one or more of the number of communication connections. This may be achieved by ranking the number of communication connections and selecting the highest ranked communication connection for each portion of the period of time. For example, the one or more of the number of communication connections may be selected based on a score assigned to individual communication connections of the number of communication connections. In this example, such a score is calculated based at least in part on one or more metrics associated with the communication connection (e.g., key performance indicator (KPI) metrics). In some embodiments, such a score is calculated based on a type of at least one satellite node associated with the communication connection. In some embodiments, such a score is calculated based on a predicted distance between a pair of satellite nodes forming the communication connection.

At 1208, the process 1200 may involve populating forwarding information to include the selected communication connections. In embodiments, the forwarding information includes, for each potential destination node, an indication of a next hop satellite node associated with that destination node. In some cases, this may further include an indication of a network interface to be used to communicate with the next hop satellite node.

At 1210, the process 1200 may involve providing the forwarding information to the satellite node. In embodiments, the forwarding information is provisioned onto a forwarding table in a memory of the satellite node. The ground station computing device may be in communication with a long-range wireless communication antenna, such as a satellite antenna. In embodiments, the forwarding information is provided to the satellite node via the antenna upon the satellite node entering into a communication range of that antenna.

Figure 13:
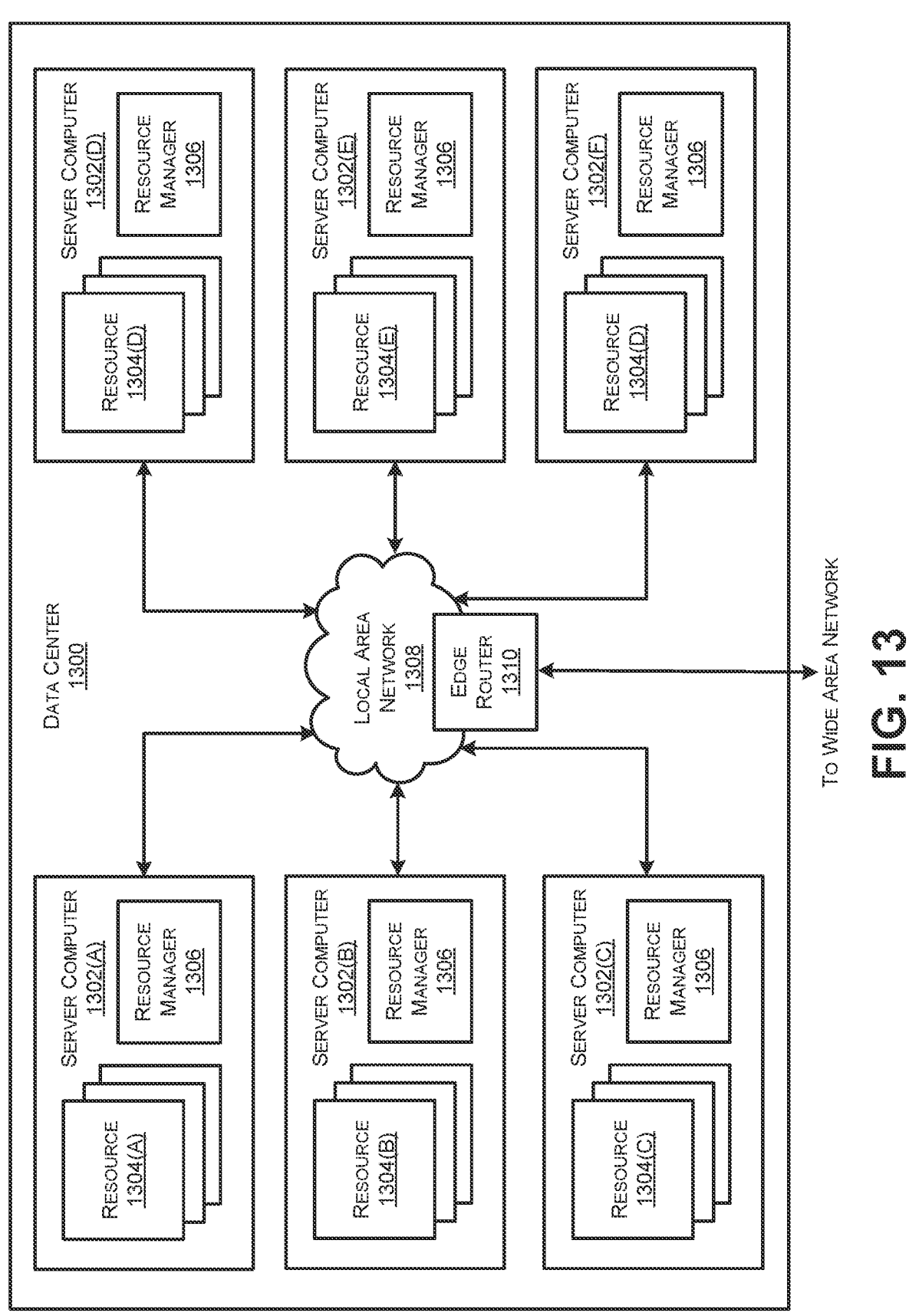
FIG. 13 is a computing system diagram illustrating a configuration for a data center 1300 that can be utilized to implement aspects of the technologies disclosed herein.

FIG. 13 is a computing system diagram illustrating a configuration for a data center 1300 that can be utilized to implement aspects of the technologies disclosed herein. The example data center 1300 shown in FIG. 13 includes several server computers 1302A-1302F (which might be referred to herein singularly as "a server computer 1302" or in the plural as "the server computers 1302") for providing computing resources. In some examples, the resources and/or server computers 1302 may include, or correspond to, the any type of networked device described herein. Although described as servers, the server computers 1302 may comprise any type of networked device, such as servers, switches, routers, hubs, bridges, gateways, modems, repeaters, access points, etc.

The server computers 1302 can be standard tower, rack-mount, or blade server computers configured appropriately for providing computing resources. In some examples, the server computers 1302 may provide computing resources 1304 including data processing resources such as VM instances or hardware computing systems, database clusters, computing clusters, storage clusters, data storage resources, database resources, networking resources, and others. Some of the servers 1302 can also be configured to execute a resource manager 1306 capable of instantiating and/or managing the computing resources. In the case of VM instances, for example, the resource manager 1306 can be a hypervisor or another type of program configured to enable the execution of multiple VM instances on a single server computer 1302. Server computers 1302 in the data center 1300 can also be configured to provide network services and other types of services.

In the example data center 1300 shown in FIG. 13, an appropriate LAN 1308 is also utilized to interconnect the server computers 1302A-1302F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1300, between each of the server computers 1302A-1302F in each data center 1300, and, potentially, between computing resources in each of the server computers 1302. It should be appreciated that the configuration of the data center 1300 described with reference to FIG. 13 is merely illustrative and that other implementations can be utilized.

In some examples, the server computers 1302 may each execute one or more application containers and/or virtual machines to perform techniques described herein.

In some instances, the data center 1300 may provide computing resources, like application containers, VM instances, and storage, on a permanent or an as-needed basis. Among other types of functionality, the computing resources provided by a cloud computing network may be utilized to implement the various services and techniques described above. The computing resources 1304 provided by the cloud computing network can include various types of computing resources, such as data processing resources like application containers and VM instances, data storage resources, networking resources, data communication resources, network services, and the like.

Each type of computing resource 1004 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1304 not mentioned specifically herein.

The computing resources 1304 provided by a cloud computing network may be enabled in one embodiment by one or more data centers 1300 (which might be referred to herein singularly as "a data center 1300" or in the plural as "the data centers 1300"). The data centers 1300 are facilities utilized to house and operate computer systems and associated components. The data centers 1300 typically include redundant and backup power, communications, cooling, and security systems. The data centers 1300 can also be located in geographically disparate locations. One illustrative embodiment for a data center 1300 that can be utilized to implement the technologies disclosed herein will be described below with regard to FIG. 14.

The LAN 1308 may be configured to enable connectivity between the server computers 1302(A-F) and an external wide area network (WAN). In some embodiments, this is accomplished via an edge router 1310 in communication with the LAN 1308. Such an edge router 1310 may use any suitable routing protocols to route communications between the various components depicted.

Figure 14:
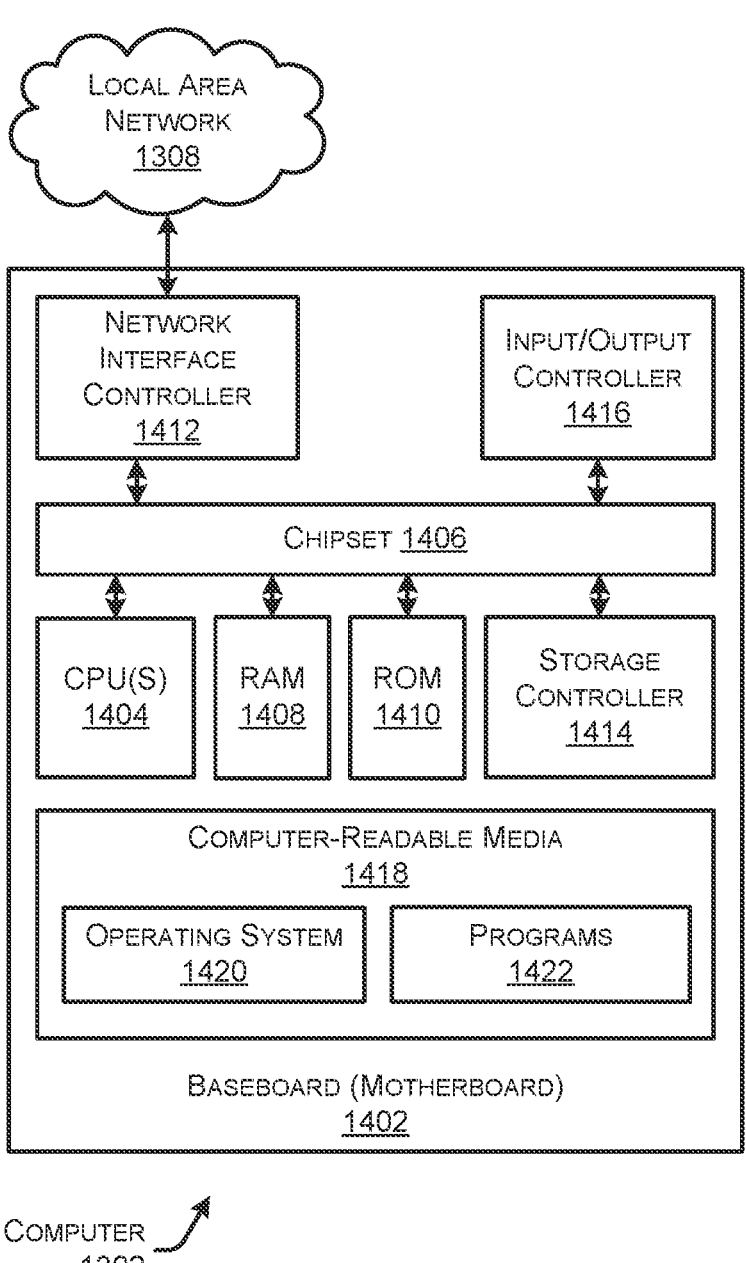
FIG. 14 is a computer architecture diagram showing an illustrative computer hardware architecture for implementing a computing device that can be utilized to implement aspects of the various technologies presented herein.

FIG. 14 is a computer architecture diagram showing an illustrative computer hardware architecture for implementing a computing device that can be utilized to implement aspects of the various technologies presented herein. The computer architecture shown in FIG. 14 illustrates a conventional server computer, workstation, desktop computer, laptop, tablet, network appliance, e-reader, smartphone, or other computing device, and can be utilized to execute any of the software components presented herein. The server computer 1400 may, in some examples, correspond to a ground station device 206, server in the application server 108, edge device 104, and/or any other device described herein, and may comprise networked devices such as servers, switches, routers, hubs, bridges, gateways, modems, repeaters, access points, etc.

The computer 1400 includes a baseboard 1402, or "motherboard," which is a printed circuit board to which a multitude of components or devices can be connected by way of a system bus or other electrical communication paths. In one illustrative configuration, one or more central processing units ("CPUs") 1404 operate in conjunction with a chipset 1406. The CPUs 1404 can be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1406 provides an interface between the CPUs 1404 and the remainder of the components and devices on the baseboard 1402. The chipset 1406 can provide an interface to a RAM 1408, used as the main memory in the computer 1400. The chipset 1406 can further provide an interface to a computer-readable storage medium such as a read-only memory ("ROM") 1410 or non-volatile RAM ("NVRAM") for storing basic routines that help to startup the computer 1400 and to transfer information between the various components and devices. The ROM 1410 or NVRAM can also store other software components necessary for the operation of the computer 1400 in accordance with the configurations described herein.

The computer 1400 can operate in a networked environment using logical connections to remote computing devices and computer systems through a network, such as the network 106. The chipset 1406 can include functionality for providing network connectivity through a NIC 1412, such as a gigabit Ethernet adapter. The NIC 1412 is capable of connecting the computer 1400 to other computing devices over the network 106. It should be appreciated that multiple NICs 1412 can be present in the computer 1400, connecting the computer to other types of networks and remote computer systems.

The computer 1400 can be connected to a storage device 1418 that provides non-volatile storage for the computer. The storage device 1418 can store an operating system 1420, programs 1422, and data, which have been described in greater detail herein. The storage device 1418 can be connected to the computer 1400 through a storage controller 1414 connected to the chipset 1406. The storage device 1418 can consist of one or more physical storage units. The storage controller 1414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1400 can store data on the storage device 1418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1418 is characterized as primary or secondary storage, and the like.

For example, the computer 1400 can store information to the storage device 1418 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 can further read information from the storage device 1418 by detecting the physical states or characteristics of one or more particular locations within the physical storage units.

In addition to the mass storage device 1418 described above, the computer 1400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1400. In some examples, the operations performed by devices and/or any components included therein, may be supported by one or more devices similar to computer 1400. Stated otherwise, some or all of the operations performed by the components included therein, may be performed by one or more computer devices 1400 operating in any arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1418 can store an operating system 1420 utilized to control the operation of the computer 1400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1418 can store other system or application programs and data utilized by the computer 1400.

In one embodiment, the storage device 1418 or other computer-readable storage media is encoded with computer-executable instructions which, when loaded into the computer 1400, transform the computer from a general-purpose computing system into a special-purpose computer capable of implementing the embodiments described herein. These computer-executable instructions transform the computer 1400 by specifying how the CPUs 1404 transition between states, as described above. According to one embodiment, the computer 1400 has access to computer-readable storage media storing computer-executable instructions which, when executed by the computer 1400, perform the various processes described above with regard to the other figures. The computer 1400 can also include computer-readable storage media having instructions stored thereupon for performing any of the other computer-implemented operations described herein.

The computer 1400 can also include one or more input/output controllers 1416 for receiving and processing input from a number of input devices, such as a keyboard, a mouse, a touchpad, a touch screen, an electronic stylus, or other type of input device. Similarly, an input/output controller 1416 can provide output to a display, such as a computer monitor, a flat-panel display, a digital projector, a printer, or other type of output device.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a first ground station computing device, a request to determine destination information for a communication;

determining, at the first ground station computing device based on information about the communication, a target computing device to which the communication is to be routed;

determining, at the first ground station computing device based on the target computing device, a location of a destination ground station;

determining, at the first ground station computing device based on the location of the destination ground station, at least one destination satellite;

generating, at the first ground station computing device, the destination information to include at least one address for the at least one destination satellite, wherein the at least one destination satellite comprises multiple satellites, and wherein the at least one address for the at least one destination satellite comprises a series of addresses associated with individual satellites of the multiple satellites, and wherein individual addresses of the series of addresses correspond to a different period of time; and providing, by the first ground station computing device, the destination information in response to the request.

2. The method of claim 1, wherein the at least one destination satellite is determined based at least in part on a period of time associated with the communication.

3. The method of claim 1, wherein the at least one destination satellite comprises multiple satellites, and wherein the at least one address for the at least one destination satellite comprises a series of addresses associated with individual satellites of the multiple satellites.

4. The method of claim 3, wherein individual addresses of the series of addresses correspond to a different period of time.

5. The method of claim 1, wherein the destination information further includes at least one of an address for the destination ground station or an address for the target computing device.

6. The method of claim 1, wherein determining the location of the destination ground station associated with the target computing device comprises:

determining the destination ground station associated with the target computing device; and retrieving the location of the destination ground station from a database.

7. The method of claim 1, wherein determining the at least one destination satellite comprises comparing orbital data for a number of satellite nodes to the location of the destination ground station.

8. A ground station computing device comprising:

one or more processors; and one or more non-transitory computer-readable media storing computer-executable instructions that, when executed by the one or more processors, cause the ground station computing device to at least:

receive a request to determine destination information for a communication;

determine, based on information about the communication, a target computing device to which the communication is to be routed;

determine, based on the target computing device, a location of a destination ground station;

determine, by mapping orbital data to the location of the destination ground station, at least one destination satellite, wherein the at least one destination satellite comprises multiple satellites, and wherein the at least one address for the at least one destination satellite comprises a series of addresses associated with individual satellites of the multiple satellites, and wherein individual addresses of the series of addresses correspond to a different period of time;

generate the destination information to include at least an address for the at least one destination satellite; and provide the destination information in response to the request.

9. The ground station computing device of claim 8, wherein the at least one destination satellite is determined based at least in part on a period of time associated with the communication.

10. The ground station computing device of claim 8, wherein the destination information further includes at least one of an address for the destination ground station or an address for the target computing device.

11. The ground station computing device of claim 8, wherein determining the location of the destination ground station associated with the target computing device comprises:

determining the destination ground station associated with the target computing device; and retrieving the location of the destination ground station from a database.

12. The ground station computing device of claim 8, wherein determining the at least one destination satellite comprises comparing orbital data for a number of satellite nodes to the location of the destination ground station.

13. A system comprising:

a network comprising a number of low earth orbit (LEO) satellites; and at least two ground stations, a first ground station of the at least two ground stations configured to perform operations comprising:

receiving, from a first LEO satellite of the network, a request to determine destination information for a communication;

determining, based on information about the communication, a target computing device to which the communication is to be routed;

determining, based on the target computing device, a location of a second ground station of the at least two ground stations;

determining, by mapping orbital data to the location of the second ground station, at least one second LEO satellite of the network;

generating the destination information to include at least one address for the at least one second LEO satellite of the network, wherein the at least one second LEO satellite is configured to relay a communication to the second ground station, wherein the at least one second LEO satellite comprises a third LEO satellite during a first period of time and a fourth LEO satellite during a second period of time, and wherein the at least one address comprises both an address for the third LEO satellite and an address for the fourth LEO satellite; and providing the destination information in response to the request.

14. The system of claim 13, further comprising at least one edge device, wherein the first LEO satellite is configured to relay the request from the at least one edge device to the first ground station.

15. The system of claim 14, wherein providing the destination information in response to the request comprises transmitting the destination information to the first LEO satellite to be relayed back to the at least one edge device.

16. The system of claim 14, wherein the first LEO satellite is configured to relay the request based on an indicator included in the request indicating that the request is an initial request for resolution.

* * * * *